US012606464B2

(12) United States Patent
Ohtsuka et al.

(10) Patent No.: US 12,606,464 B2
(45) Date of Patent: Apr. 21, 2026

(54) MEMBRANE SEPARATION METHOD

(71) Applicant: KURITA WATER INDUSTRIES LTD., Tokyo (JP)

(72) Inventors: Yuta Ohtsuka, Tokyo (JP); Kunihiro Hayakawa, Tokyo (JP); Gou Nakagawa, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 344 days.

(21) Appl. No.: 18/266,259

(22) PCT Filed: Dec. 24, 2021

(86) PCT No.: PCT/JP2021/048165
§ 371 (c)(1),
(2) Date: Jun. 8, 2023

(87) PCT Pub. No.: WO2022/158253
PCT Pub. Date: Jul. 28, 2022

(65) Prior Publication Data
US 2024/0025772 A1      Jan. 25, 2024

(30) Foreign Application Priority Data
Jan. 20, 2021      (JP) ................................. 2021-007020

(51) Int. Cl.
*C02F 1/44*          (2023.01)
*B01D 65/08*          (2006.01)
*C02F 1/76*          (2023.01)

(52) U.S. Cl.
CPC .............. *C02F 1/441* (2013.01); *B01D 65/08* (2013.01); *C02F 1/76* (2013.01); *B01D 2321/168* (2013.01); *C02F 2303/20* (2013.01)

(58) Field of Classification Search
CPC .................. B01D 61/025; B01D 65/08; B01D 2311/2634; C02F 2209/29; C02F 2303/20
See application file for complete search history.

(56) References Cited

U.S. PATENT DOCUMENTS

2013/0026097 A1      1/2013   Hirao et al.
2014/0124442 A1      5/2014   Nakamura et al.
(Continued)

FOREIGN PATENT DOCUMENTS

CN          102821610          12/2012
CN          103648985          3/2014
(Continued)

OTHER PUBLICATIONS

"Office Action of United Arab Emirates Counterpart Application", issued on Jan. 15, 2025, pp. 1-8.
(Continued)

*Primary Examiner* — Bradley R Spies
(74) *Attorney, Agent, or Firm* — JCIPRNET

(57) ABSTRACT

The purpose of the present invention is to provide a technique whereby it becomes possible to operate for a longer period of time in an aqueous system equipped with a membrane separation apparatus. The present invention can provide a membrane separation method, the method comprising containing a combined-chlorine-based oxidizing agent to water of interest, and allowing the water of interest which contains the combined-chlorine-based oxidizing agent to pass through a membrane separation apparatus, in which the water of interest which contains the combined-chlorine-based oxidizing agent has a Free 300-second value of 0.036 mg/L-Cl$_2$ or more wherein the Free 300-second value is a result of the measurement of a chlorine concentration after 300 seconds using a free chlorine measurement reagent.

11 Claims, 2 Drawing Sheets

Elapsed days (days)

(56)                    References Cited

U.S. PATENT DOCUMENTS

| | | |
|---|---|---|
| 2018/0282186 A1 | 10/2018 | Nakamura et al. |
| 2021/0170341 A1 | 6/2021 | Endo |

FOREIGN PATENT DOCUMENTS

| | | |
|---|---|---|
| CN | 111989298 | 11/2020 |
| JP | H01104310 | 4/1989 |
| JP | 2006263510 | 10/2006 |
| JP | 2018176116 | 11/2018 |
| JP | 2020028865 | 2/2020 |
| KR | 1020200138965 | 12/2020 |
| WO | 2013005787 | 1/2013 |
| WO | 2019208405 | 10/2019 |

OTHER PUBLICATIONS

"Office Action of China Counterpart Application", issued on Dec. 4, 2023, with English translation thereof, p. 1-p. 11.
"Search Report of Europe Counterpart Application", issued on May 13, 2024, p. 1-p. 10.
"International Search Report (Form PCT/ISA/210) of PCT/JP2021/048165", mailed on Mar. 15, 2022, with English translation thereof, pp. 1-4.
"Written Opinion of the International Searching Authority (Form PCT/ISA/237) of PCT/JP2021/048165", mailed on Mar. 15, 2022, with partial English translation thereof, pp. 1-8.
Johannes Simon Vrouwenvelder et al., "Biofouling of spiral wound membrane systems," IWA Publishing, vol. 10, Apr. 2011, pp. 1-35.
"Notice of Reasons for Refusal of Japan Counterpart Application", issued on Mar. 8, 2022, with English translation thereof, p. 1-p. 10.
"Notice of Reasons for Refusal of Japan Counterpart Application", issued on Oct. 18, 2022, with English translation thereof, p. 1-p. 4.
Office Action of Chile Counterpart Application, with English translation thereof, issued on May 30, 2024, pp. 1-29.
Office Action of Saudi Arabia Counterpart Application, with English translation thereof, issued on Jun. 4, 2024, pp. 1-13.
"Resolution of substantive corrections under penalty of rejection of Chile Counterpart Application", with English translation thereof, issued on Sep. 25, 2025, pp. 1-6.
"Ministry of Economic Affairs Intellectual Property Bureau Review Notice of Taiwan Counterpart Application", issued on Jan. 6, 2026, with English translation thereof, pp. 1-23.

MEMBRANE SEPARATION METHOD

CROSS-REFERENCE TO RELATED APPLICATION

This application is a 371 application of an international PCT application serial no. PCT/JP2021/048165, filed on Dec. 24, 2021, which claims the priority benefit of Japan application no. 2021-007020, filed on Jan. 20, 2021. The entirety of each of the above-mentioned patent applications is hereby incorporated by reference herein and made a part of this specification.

TECHNICAL FIELD

The present invention relates to a membrane separation method and the like.

BACKGROUND ART

Water treatment of water of interest is performed by using a membrane separation treatment process or a membrane separation apparatus configured to separate out suspended matter or dissolved substances and ions in the water of interest using permeable membranes such as reverse osmosis membranes (RO membranes), nanofiltration membranes (NF membranes), ultrafiltration membranes (UF membranes), and microfiltration membranes (MF membranes), and accordingly, desired treated water such as pure water, ultrapure water, and recycled water is obtained.

For example, in seawater desalination plants, wastewater recovery plants, and the like, RO membrane apparatuses are widely used, which can efficiently remove electrolytes and medium and low molecular weight organic components. As a water treatment apparatus or a water treatment aqueous system including an RO membrane apparatus, one or more apparatuses selected from apparatuses such as a pressure filtration apparatus, a gravity filtration apparatus, a coagulating sedimentation treatment apparatus, a pressure flotation filtration apparatus, an immersion membrane apparatus, and a membrane pretreatment apparatus are appropriately provided usually at a stage previous to the RO membrane apparatus depending on the aqueous system. The water of interest is pretreated by these preceding apparatuses and then supplied to the RO membrane apparatus for RO membrane separation to produce desired treated water (specifically, permeation water).

In such water treatment, microorganisms (for example, bacteria or microalgae) contained in the water of interest proliferate in the flow path or apparatus piping or on the surface of the permeable membrane and they form slime, and accordingly, problems such as odor generation due to the growth of microorganisms in the system and a decrease in the amount of water permeating through the membrane (for example, biofouling) may be caused. In order to prevent such microbial contamination of aqueous systems, chemical agents such as bactericides and slime inhibitors are added to the water of interest constantly or intermittently.

In addition, in order to suppress such microbial contamination of permeable membranes (for example, biofouling) in the membrane separation apparatus or the membrane separation treatment process, and in the aqueous system having these (for example, water treatment aqueous system or cooling aqueous system), chemical agents such as aqueous hydrogen peroxide, combined halogen agents (for example, combined chlorine agents or combined brominating agents), and oxidizing agents (for example, halogen) have been extensively studied.

For example, as a method for performing membrane separation by supplying water of interest to a permeable membrane, Patent Literature 1 proposes a membrane separation method in which chloramine is caused to be present in the water of interest, and a membrane separation method in which the chloramine may be generated by adding ammonium ions to the water of interest containing free chlorine.

Further, for example, Patent Literature 2 proposes a membrane separation method in which a membrane separation slime inhibitor that contains a chlorine-based oxidizing agent and a sulfamic acid compound, and a combined chlorine agent consisting of a chlorine-based oxidizing agent and a sulfamic acid compound in washing water or feedwater fed to the membrane separation apparatus are caused to be present.

CITATION LIST

Patent Literature

[Patent Literature 1]
Japanese Patent Laid-Open No. 01-104310
[Patent Literature 2]
Japanese Patent Laid-Open No. 2006-263510

SUMMARY OF INVENTION

Technical Problem

As described above, in intensive studies on the membrane separation method using an oxidizing agent in the membrane separation apparatus or the membrane separation treatment process, combined-chlorine-based oxidizing agents such as sodium chlorosulfamate have been widely used because it is possible to suppress biofouling without changing the performance of reverse osmosis membranes. Furthermore, conventionally, the water treatment conditions were determined only by the value of the total chlorine concentration in the water of interest without considering the difference in chemical effects such as the bactericidal power of combined-chlorine-based oxidizing agents, and operation management was carried out such that the aqueous system could be operated for a long period of time.

However, the present inventors have found that, depending on the formulation and grade storage, the status of raw materials, the chemical effects such as the bactericidal power of the combined-chlorine-based oxidizing agent cannot be sufficiently exhibited, and for this reason, operation for a long period of time was not possible in an aqueous system equipped with a membrane separation apparatus in some cases. Specifically, as shown in Test Example 2 in [Examples] below, when the present inventors used the total chlorine concentration, which is generally used as an indicator of chemical effects, to contain a plurality of combined-chlorine-based oxidizing agents to the water of interest such that the total chlorine concentrations $(mg/L\text{-}Cl_2)$ in the water of interest after adding the chemical agents were the same, one of these combined-chlorine-based oxidizing agents could not sufficiently suppress the change in module differential pressure, and the operation for a longer period of time was not possible in the aqueous system equipped with the membrane separation apparatus.

Therefore, the main objective of the present invention is to provide a technique in which the operation for a longer period of time is possible in an aqueous system equipped with a membrane separation apparatus.

Solution to Problem

As described above, even when the total chlorine concentration in the water of interest containing the combined-chlorine-based oxidizing agent is used as an indicator, as described above, the operation for a longer period of time is not possible in some cases, and the reason for this is completely unknown. Therefore, the effect of suppressing biofouling could not be sufficiently predicted or evaluated, and it was also difficult to set appropriate treatment conditions.

However, in the course of intensive studies, the present inventors have newly found that, as shown in [Examples] below, by extending the time to read the chlorine concentration value (mg/L-Cl$_2$) from containing a free chlorine measurement reagent (Free reagent), which is used in an N,N-diethyl-1,4-phenylenediamine (DPD) method shown in JIS K 040-33-10:1999, to the water of interest containing the combined-chlorine-based oxidizing agent, to 300 seconds, the chlorine concentration value of this Free 300-second value can be used as an indicator of chemical effects, and have found that, quite by chance, when the water of interest to which the combined-chlorine-based oxidizing agent is contained is prepared based on an indicator related to the Free 300-second value, this prepared water of interest containing the combined-chlorine-based oxidizing agent is allowed to pass through the membrane separation apparatus, and an aqueous system equipped with a membrane separation apparatus can be operated for a longer period of time.

Thus, the present invention was completed as follows.

The present invention provides a membrane separation method in which a combined-chlorine-based oxidizing agent is contained to water of interest, and the water of interest containing the combined-chlorine-based oxidizing agent is allowed to pass through a membrane separation apparatus, in which the water of interest containing the combined-chlorine-based oxidizing agent is water of interest having a Free 300-second value of 0.036 mg/L-Cl$_2$ or more, while the Free 300-second value is a measurement result of a chlorine concentration after 300 seconds using a free chlorine measurement reagent.

In addition, the present invention provides a membrane separation method in which a combined-chlorine-based oxidizing agent is contained to water of interest, and the water of interest containing the combined-chlorine-based oxidizing agent is allowed to pass through a membrane separation apparatus, in which the water of interest containing the combined-chlorine-based oxidizing agent is water of interest having [Free 300-second value/Log$_{10}$ (biofouling potential)] of 0.008 or more, the Free 300-second value is a chlorine concentration (mg/L-Cl$_2$) obtained by containing a combined chlorine-based oxidizing agent to water of interest and performing measurement after 300 seconds using a free chlorine measurement reagent in the water of interest containing the combined chlorine-based oxidizing agent, and the biofouling potential is the number of bacteria (cfu/mL) in a sample when stored for 7 days when water of interest before containing a combined-chlorine-based oxidizing agent is stored under dark conditions at 30° C. for 7 days.

A biofouling potential may be $1 \times 10^3$ to $1 \times 10^7$ cfu/mL in the membrane separation method.

The water of interest containing the combined-chlorine-based oxidizing agent may be water of interest having [Free 300-second value/Log$_{10}$ (biofouling potential)] of 0.008 or more.

The combined-chlorine-based oxidizing agent may be contained to the water of interest before the water is allowed to pass through a reverse osmosis membrane apparatus.

(a) Free 300-second value and/or (b) biofouling potential are used as indicators, and based on the indicators, an addition amount of the combined-chlorine-based oxidizing agent to be added to the water of interest may be controlled.

The membrane separation method may be a method for suppressing biofouling or a method for operating an aqueous system equipped with a membrane separation apparatus.

Advantageous Effects of Invention

According to the present invention, it is possible to provide a technique in which the operation for a longer period of time is possible in an aqueous system equipped with a membrane separation apparatus. The effects are not necessarily limited to those described here, and may be any of the effects described in this specification.

DESCRIPTION OF EMBODIMENTS

Figure 1:
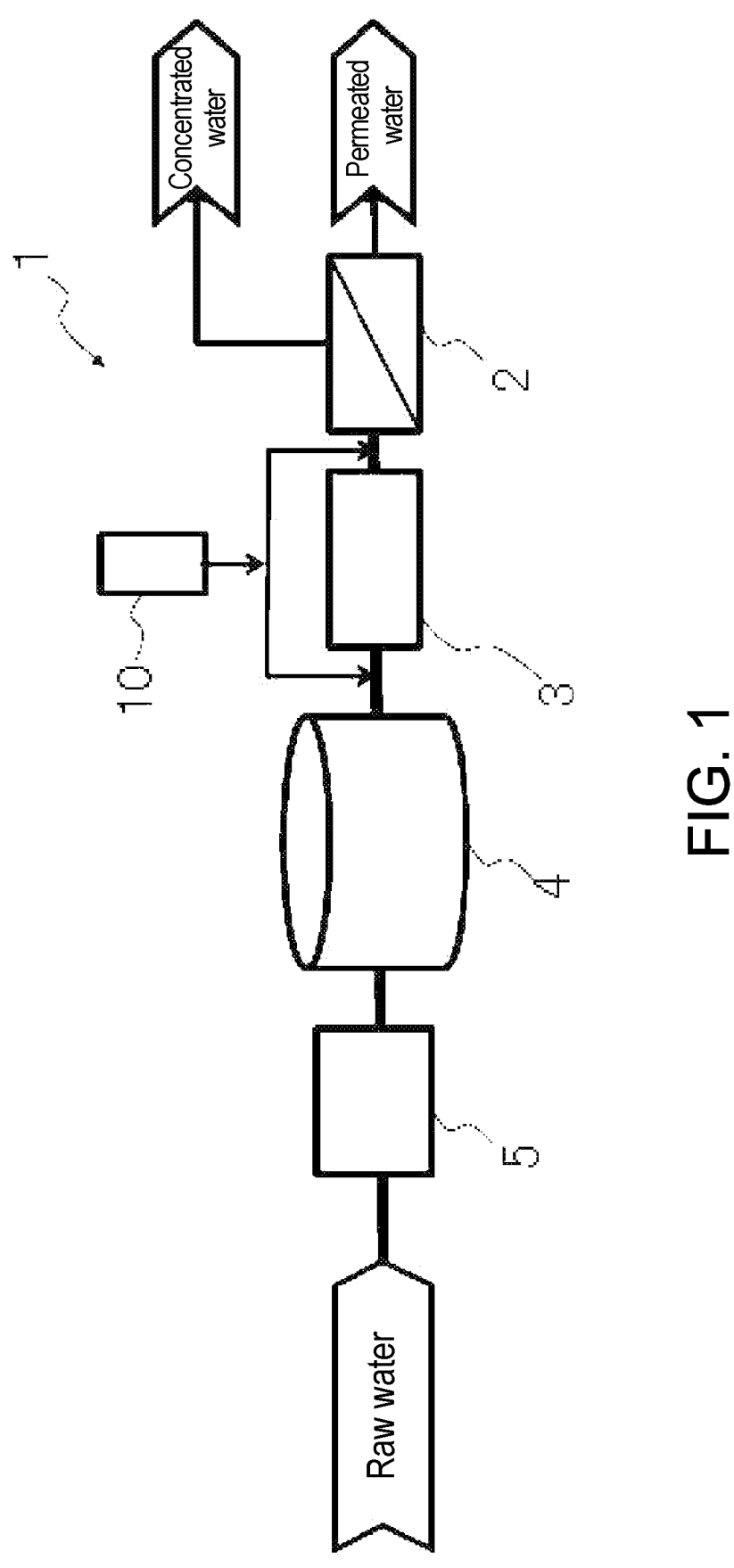
FIG. 1 is a schematic diagram showing an example of an aqueous system of the present invention.

Hereinafter, embodiments for carrying out the present invention will be described. In addition, the embodiments described below show an example of a typical embodiment of the present invention, and accordingly, the scope of the present invention is not limited nor interpreted by this. In addition, the upper limit value and the lower limit value in numerical values can be combined in any manner as desired.

1. Membrane Separation Method According to Present Embodiment

The present embodiment can provide a membrane separation method in which a combined-chlorine-based oxidizing agent is contained to water of interest, and the water of interest which contains the combined-chlorine-based oxidizing agent is allowed to pass through a membrane separation apparatus.

The combined-chlorine-based oxidizing agent or the water of interest containing the combined-chlorine-based oxidizing agent used in the present embodiment preferably uses one or more selected from a Free 300-second value, [Free 300-second value/Log$_{10}$ (biofouling potential)], stabilized combined chlorine concentration, [total chlorine concentration/Free 300-second value], biofouling potential, total chlorine concentration, and the like as indicators, and is prepared based on the indicators.

Among these indicators, it is more preferable to use the "indicator related to the Free 300-second value" as a first indicator and use the first indicator as an important indicator. It is also more preferable to use Free 300-second value and/or [Free 300-second value/$Log_{10}$ (biofouling potential)] as the "indicator related to Free 300-second value".

Furthermore, one or more indicators appropriately selected from indicators other than the first indicator (for example, total chlorine concentration), may be further added to the first indicator as a second indicator. Based on the combined indicators, the combined-chlorine-based oxidizing agent used in the present embodiment or the water of interest containing the combined-chlorine-based oxidizing agent may be prepared.

Furthermore, it is desirable that the membrane separation method of the present invention be a preferred aspect having the following first embodiment and/or second embodiment. Each configuration such as indicators, the combined-chlorine-based oxidizing agent, the water of interest, and the membrane separation described in the first embodiment and the second embodiment can be appropriately combined.

A technique can be provided in which the operation for a longer period of time is possible in an aqueous system equipped with a membrane separation apparatus by the membrane separation method according to the present embodiment.

In addition, the membrane separation method according to the present embodiment can also be applied to a method for suppressing biofouling, a method for suppressing microbial slime, a method for suppressing an increase in module differential pressure, a method for operating a membrane separation apparatus or an aqueous system equipped with the apparatus, and the like.

1-1. Outline of First Embodiment of Present Invention

As a preferable first embodiment of the present invention, the Free 300-second value (mg/L-$Cl_2$) in the water of interest containing the combined-chlorine-based oxidizing agent (hereinafter also referred to as "Free 300-second value") is preferably used as an indicator of chemical effects in the water of interest containing the combined-chlorine-based oxidizing agent. In addition, the Free 300-second value may be used as an indicator of chemical effects of the combined-chlorine-based oxidizing agent. The chemical effects are not particularly limited, and examples thereof include an effect of improving membrane separation, an effect of suppressing biofouling, an effect of suppressing microbial slime, and an effect of suppressing a module differential pressure increase. Further, the Free 300-second value can also be used as a reference value (threshold value) when determining the properties or suitability of chemical effects in the water of interest containing the combined-chlorine-based oxidizing agent or in the combined-chlorine-based oxidizing agent.

In the first embodiment, the water of interest containing the combined-chlorine-based oxidizing agent more preferably has a Free 300-second value of a predetermined value (preferably 0.036 mg IL-$Cl_2$) or more, while the Free 300-second value is a measurement result of a chlorine concentration after 300 seconds using a free chlorine measurement reagent.

Further, in the first embodiment, it is more preferable to prepare a combined-chlorine-based oxidizing agent having a Free 300-second value of a predetermined value (preferably 0.036 mg/L-$Cl_2$) or more in the water of interest when contained to the water of interest.

Further, in the first embodiment, it is more preferable to contain the combined-chlorine-based oxidizing agent, which has the Free 300-second value of a predetermined value (preferably 0.036 mg/L-$Cl_2$) or more in the water of interest, to the water of interest.

In the first embodiment, the ratio of the "Free 300-second value (mg/L-$Cl_2$) in the water of interest containing the combined-chlorine-based oxidizing agent that is contained in the total chlorine concentration (mg/L-$Cl_2$) in the water of interest containing the combined-chlorine-based oxidizing agent" (hereinafter also referred to as the ratio of [Free 300-second value/total chlorine concentration]), in which the total chlorine concentration in the water of interest containing the combined-chlorine-based oxidizing agent is taken into consideration in addition to the Free 300-second value, can be used an indicator or a reference value (threshold value) for chemical effects as described above.

According to the first embodiment, it is possible to provide a membrane separation method in which a combined-chlorine-based oxidizing agent is contained to water of interest, and the water of interest containing the combined-chlorine-based oxidizing agent is allowed to pass through a membrane separation apparatus, in which the water of interest containing the combined-chlorine-based oxidizing agent is water of interest having a Free 300-second value of a predetermined value (preferably 0.036 mg/L-$Cl_2$) or more, while the Free 300-second value is a measurement result of a chlorine concentration after 300 seconds using a free chlorine measurement reagent.

<Method for Measuring Free 300-Second Value (Mg/L-$Cl_2$)>

The Free 300-second value (mg/L-$Cl_2$) is preferably a measurement result of chlorine concentration in the water of interest containing the combined-chlorine-based oxidizing agent after 300 seconds using the free chlorine measurement reagent when the temperature of the test environment is 25° C. with reference to <Method for calculating total chlorine concentration (total residual chlorine concentration)> below. The measurement time of the Free 300-second value is preferably 300 seconds or 300 to 310 seconds, because the measurement value is stable after 300 seconds after adding the free chlorine measurement reagent to the sample.

<Method for Calculating Total Chlorine Concentration (Total Residual Chlorine Concentration)

The total chlorine concentration (total residual chlorine concentration) in the present embodiment can be calculated based on the following measurement method according to JIS K 040-33-10:1999.

Total chlorine concentration (total residual chlorine concentration)=concentration of free chlorine+activated combined chlorine concentration+stabilized combined chlorine concentration Free chlorine concentration: Free chlorine concentration by DPD method (pocket Colorimeter, Chlorine, Free+Total, LR/HR, with Box, manufactured by HACH) [Here, free chlorine concentration by DPD method is the measurement result of chlorine concentration after 5 to 30 seconds using the DPD (Free) reagent, which is the free chlorine measurement reagent (mg/L-$Cl_2$).]

Activated combined chlorine concentration: Activated combined chlorine concentration is a value obtained by subtracting the measurement result of the free chlorine concentration (mg/L-$Cl_2$) from the chlorine concentration measurement result (mg/L-Cl$_2$) after 300 seconds using the DPD (Free) reagent, which is the free chlorine measurement reagent.

Stabilized combined chlorine concentration: Stabilized combined chlorine concentration is a value obtained by subtracting the chlorine concentration measurement result (mg/L-Cl$_2$) after 300 seconds using the DPD (Free) reagent, which is the free chlorine measurement reagent, from the chlorine concentration measurement result (mg/L-Cl$_2$) after 180 seconds using the DPD (Total) reagent, which is the total chlorine measurement reagent.

Free chlorine ratio (%)=(free chlorine concentration/ total residual chlorine concentration)×100

Stabilized combined chlorine ratio (%)=(stabilized combined chlorine concentration/total residual chlorine concentration)×100

The temperature of the test environment is set to 25° C.
<Method for Calculating [Free 300-Second Value/Total Chlorine Concentration]>

The ratio of [Free 300-second value/total chlorine concentration] can be calculated by [Free 300-second value (mg/L-Cl$_2$) in water of interest containing the combined-chlorine-based oxidizing agent/total chlorine concentration (mg/L-Cl$_2$) in water of interest containing combined-chlorine-based oxidizing agent)]×100(%).

The "Free 300-second value (mg/L-Cl$_2$)" can be measured according to the above <Method for measuring Free 300-second value (mg/L-Cl$_2$)>. Further, the "total chlorine concentration (mg/L-Cl$_2$) in water of interest containing combined-chlorine-based oxidizing agent" can be measured by the above <Method for calculating total residual chlorine concentration>.

1-2. Outline of Second Embodiment of Present Invention

According to a preferable second embodiment of the present invention, [Free 300-second value (mg/L-Cl$_2$)/Log$_{10}$ (biofouling potential (cfu/mL))] in the water of interest containing the combined-chlorine-based oxidizing agent (hereinafter referred to as [Free 300-second value/Log$_{10}$ (biofouling potential)]) is preferably used as an indicator of chemical effects in the water of interest containing the combined-chlorine-based oxidizing agent. In addition, [Free 300-second value/Log$_{10}$ (biofouling potential)] may also be used as an indicator of chemical effects of the combined-chlorine-based oxidizing agent. Examples of the chemical effects include an effect of improving membrane separation, an effect of suppressing biofouling, an effect of suppressing microbial slime, and an effect of suppressing an increase in module differential pressure.

Further, the [Free 300-second value/Log$_{10}$ (biofouling potential)] can also be used as a reference value (threshold value) when determining the properties or suitability of chemical effects in the water of interest containing the combined-chlorine-based oxidizing agent or in the combined-chlorine-based oxidizing agent.

The Free 300-second value (mg/L-Cl$_2$) is preferably the chlorine concentration (mg/L-Cl$_2$) obtained by containing the combined-chlorine-based oxidizing agent to the water of interest, and performing measurement after 300 seconds using the free chlorine measurement reagent in the water of interest containing the combined-chlorine-based oxidizing agent.

The biofouling potential is preferably the number of bacteria (cfu/mL) in a sample when stored for 7 days when the water of interest before containing the combined-chlorine-based oxidizing agent is stored under dark conditions at 30° C. for 7 days.

In the second embodiment, the water of interest containing the combined-chlorine-based oxidizing agent is more preferably the water of interest having [Free 300-second value/Log$_{10}$ (biofouling potential)] of a predetermined value (preferably 0.008) or more.

Further, in the second embodiment, it is more preferable to prepare a combined-chlorine-based oxidizing agent having the [Free 300-second value/Log$_{10}$ (biofouling potential)] of a predetermined value (preferably 0.008) or more in the water of interest when contained to the water of interest.

Further, in the second embodiment, it is more preferable to contain the combined-chlorine-based oxidizing agent having the [Free 300-second value/Log$_{10}$ (biofouling potential)] of a predetermined value (preferably 0.008) or more in the water of interest, to the water of interest.

The second embodiment is a membrane separation method in which a combined-chlorine-based oxidizing agent is contained to the water of interest, and the water of interest containing the combined-chlorine-based oxidizing agent is allowed to pass through a membrane separation apparatus, and it is possible to provide a membrane separation method in which the water of interest containing the combined-chlorine-based oxidizing agent is the water of interest having the [Free 300-second value/Log$_{10}$ (biofouling potential)] of a predetermined value (preferably 0.008) or more.

The Free 300-second value is preferably the chlorine concentration (mg/L-Cl$_2$) obtained by containing the combined-chlorine-based oxidizing agent to the water of interest, and performing measurement after 300 seconds using the free chlorine measurement reagent in the water of interest containing the combined-chlorine-based oxidizing agent.

The biofouling potential is preferably the number of bacteria (cfu/mL) in a sample when stored for 7 days when the water of interest before containing the combined-chlorine-based oxidizing agent is stored under dark conditions at 30° C. for 7 days.

<Method for Calculating [Free 300-Second Value/Log$_{10}$ (Biofouling Potential)]>

The ratio of [Free 300-second value/Log$_{10}$ (biofouling potential)] can be calculated by [Free 300-second value (mg/L-Cl$_2$) in water of interest containing combined-chlorine-based oxidizing agent/Log$_{10}$ (biofouling potential (cfu/mL))].

The "Free 300-second value (mg/L-Cl$_2$)" can be measured according to the above <Method for measuring Free 300-second value (mg/L-Cl$_2$)>.

In addition, Log$_{10}$ of Log$_{10}$ (biofouling potential (cfu/mL)) is a common logarithm, and the measurement of (biofouling potential (cfu/mL)) can be performed by the following <Method for measuring biofouling potential (cfu/mL)>.

<Method for Measuring Biofouling Potential (Cfu/mL)>

The measurement of "biofouling potential (cfu/mL)" is performed by storing the water of interest under dark conditions at 30° C. for 7 days, and measuring the number of bacteria (cfu/mL) in the sample when stored for these 7 days.

The number of bacteria (cfu/mL) is a colony-forming unit, and the viable count (cfu/mL) can be measured according to "General bacteria test method in service water and wastewater according to JIS K 0350-10-10: 2002". For example, the number of colonies that arise when a sample when stored for 7 days is inoculated onto a solid medium (for example, agar medium) in which the microorganisms contained in the water of interest can grow, and cultured under the conditions in which the microorganisms in the water of interest can grow, can be measured. For example, when the water of interest is freshwater, a culture medium for freshwater may be used, and when the water of interest is seawater, a culture medium for seawater may be used. In addition, the smear amount may be, for example, 10 to 100 μL (which may be diluted as appropriate), and the culture conditions may be, for example, 25 to 40° C. for 1 to 2 days or 1 to 7 days.

As the solid medium, a commercially available solid medium for measuring microorganisms can be used, and the culture may be performed with reference to the protocol attached to the commercially available product. Examples of commercially available solid media for measuring microorganisms include, but are not limited to, trypticase soy agar (TSA) and tryptone soy broth (TSB). In addition, when a solid medium is not used, it is also possible to use a film medium for microbiological test, the film medium for microbiological test may be a commercially available product, and cultivation may be performed with reference to the protocol attached to this commercially available product. Examples of commercially available film media for microbiological testing include, but are not limited to, 3M™ Petrifilm™ viable count measurement plate (AC Plate).

1-3. Preferred Aspects of Present Embodiment

Hereinafter, the combined-chlorine-based oxidizing agent, the indicator, the water of interest, the membrane separation, each condition, each process, and the like in the present embodiment (more preferably, the first embodiment and the second embodiment) will be described. The description of each configuration of the second embodiment also applies to the first embodiment, and the description can be appropriately adopted as the first embodiment. Further, the description of each configuration of the first embodiment also applies to the second embodiment, and the description can be appropriately adopted as the second embodiment.

1-3-1. Combined-Chlorine-Based Oxidizing Agent

The combined-chlorine-based oxidizing agent used in the present embodiment preferably contains combined chlorine, and the combined chlorine can be present in the form of a chloramine compound. Examples thereof include a mono-chloramine compound or a dichloramine compound, and the monochloramine compound is preferable. A commercially available product may be used as the combined-chlorine-based oxidizing agent, or one obtained by a known production method may be used.

Furthermore, it is more preferable to use a combined-chlorine-based oxidizing agent that satisfies the criteria such as the Free 300-second value or a ratio value of [Free 300-second value/biofouling potential], or the combined-chlorine-based oxidizing agent prepared to satisfy at least one of these criteria.

The form of the combined-chlorine-based oxidizing agent, such as powder or liquid, is not particularly limited, but an aqueous solution preparation is preferred from the viewpoint of handling and production.

1-3-1-1. Chloramine Compound

A chloramine compound refers to a compound having at least one bond between a nitrogen atom and a chlorine atom (N—Cl bond).

Examples of chloramine compounds include chloramines composed of ammonium salts and chlorine, chlorosulfamic acid compounds, and other chloramine compounds, and one or more selected from these can be used.

Examples of ammonium salts include ammonium sulfate, ammonium nitrate, and ammonium chloride, and one or more selected from these can be used. Among these, ammonium sulfate is preferable.

The sulfamic acid compound constituting the chlorosulfamic acid compound is preferably a compound represented by $R^1R^2NSO_3H$ . . . [1]. Preferably, $R^1$ and $R^2$ in the general formula [1] are each independently H or an alkyl group having 1 to 8 carbon atoms.

Examples of sulfamic acid compounds include sulfamic acid (amidosulfuric acid) or a salt thereof in which both the two $R^1$ and $R^2$ groups are hydrogen atoms; sulfamic acid or a salt thereof in which one of the two $R^1$ and $R^2$ groups is hydrogen atom and the other is an alkyl group having 1 to 8 carbon atoms, such as N-methylsulfamic acid, N-ethyl-sulfamic acid, N-propylsulfamic acid, N-isopropylsulfamic acid, and N-butylsulfamic acid; and sulfamic acid or a salt thereof in which both of the two $R^1$ and $R^2$ groups are alkyl groups having 1 to 8 carbon atoms, such as N,N-dimethyl-sulfamic acid, N,N-diethylsulfamic acid, N,N-dipropylsul-famic acid, N,N-dibutylsulfamic acid, N-methyl-N-ethylsul-famic acid, and N-methyl-N-propylsulfamic acid, and sulfamic acid compounds are not limited to these. One or more selected from these can be used.

As the sulfamic acid compound, narrowly defined sul-famic acid in which each of $R^1$ and $R^2$ is H is more preferable, but N-methylsulfamic acid, N,N-dimethylsul-famic acid, N-phenylsulfamic acid and the like can also be used. As the sulfamic acid compound, these sulfamic acids may be used in the form of a free (powder) acid, or may be a salt such as an alkali metal salt (for example, a sodium salt, a potassium salt, or a lithium salt).

Chlorosulfamic acid refers to sulfamic acid ($H_2NSO_2OH$) in which at least one hydrogen atom in the $NH_2$ group is replaced with a chlorine atom. Examples of chlorosulfamic acid include monochlorosulfamic acid and dichlorosulfamic acid.

Chlorosulfamate refers to a sulfamic acid ($H_2NSO_2OH$) in which at least one hydrogen atom in the OH group is replaced with a metal ion (for example, an alkali metal ion such as lithium ion, sodium ion, and potassium ion).

Examples of chlorosulfamate include lithium chloro-sulfamate, sodium chlorosulfamate, and potassium chloro-sulfamate, and one or more selected from these can be used. Among these, sodium chlorosulfamate is preferable.

Moreover, chloramine T and the like can be used as another chloramine compound.

In addition, the salts of the chloramine compounds are not particularly limited, and examples thereof include alkali metal salts such as sodium salts and potassium salts; alkaline earth metal salts such as calcium salts, strontium salts, and barium salts; other metal salts such as manganese salts, copper salts, zinc salts, iron salts, cobalt salts, and nickel salts; ammonium salts and organic ammonium salts; and amino acid salts such as guanidine salts, and one or more selected from these can be used.

1-3-1-2. Method for Preparing Combined-Chlorine-Based Oxidizing Agent

As the combined-chlorine-based oxidizing agent, a chlo-rine stabilizer, an alkali, and a chlorine-based oxidizing agent can be added to prepare a chemical agent containing combined chlorine, and the prepared combined-chlorine-based oxidizing agent may be added to the water of interest. In addition, each chemical agent of these three components of the chlorine stabilizer, the alkali, and the chlorine-based oxidizing agent may be added to the water of interest simultaneously or separately, these three components may be mixed in the water of interest, and accordingly, the combined-chlorine-based oxidizing agent may be formed in the water of interest. In addition, the total chlorine concentration ($Cl_2$) in the combined-chlorine-based oxidizing agent is also called available chlorine ($Cl_2$), and various chlorine concentrations such as the total chlorine concentration in the combined-chlorine-based oxidizing agent can be measured according to the above <Method for calculating total residual chlorine concentration>.

The chlorine stabilizer is not particularly limited as long as it is possible to react with an oxidizing agent to generate combined chlorine, but the compounds having an amino group are preferable. The chlorine stabilizer is not particularly limited, and examples thereof include the above-described ammonium salts and sulfamic acid compounds, and among these, sulfamic acid compounds are preferable.

Examples of alkalis include, but are not particularly limited to, oxides and hydroxides. Alkali metal oxides or hydroxides are preferable, one or more selected from sodium hydroxide, potassium hydroxide, lithium hydroxide, and the like are preferable, and among these, sodium hydroxide and/or potassium hydroxide are more preferable. The alkali is preferably in the form of an aqueous solution, and the alkali content in the alkaline aqueous solution is preferably 35 to 55% by mass.

Examples of the chlorine-based oxidizing agent include one or more selected from chlorine gas, chlorine dioxide, hypochlorous acid, chlorous acid, chloric acid, perchloric acid, chlorinated isocyanuric acid, and salts thereof (preferably alkali metal salts), and the like. Among these, hypochlorous acid or a salt thereof is preferable, and hypochlorite is more preferable. The total chlorine concentration ($Cl_2$) of the chlorine-based oxidizing agent is not particularly limited, but may be, for example, 10 to 16% or 12 to 16%, and commercially available products may be used.

The usage ratio of the chlorine-based oxidizing agent and the chlorine stabilizer is not particularly limited, but the chlorine stabilizer (preferably a sulfamic acid compound) added to 1 mol of the total chlorine concentration ($Cl_2$) of the chlorine-based oxidizing agent is preferably 0.5 to 5.0 mol, more preferably 0.5 to 2.0 mol, even more preferably 1.0 to 1.5 mol. The usage ratio may be the content ratio in the chemical agent.

The pH of the combined-chlorine-based oxidizing agent is preferably an alkali of pH 7 or more, more preferably 10 or more, still more preferably 11 or more, more preferably 12 or more, and more preferably 13 or more.

The stabilized combined chlorine concentration (mg/L-$Cl_2$) in the combined-chlorine-based oxidizing agent is not particularly limited.

The ratio of [chlorine concentration after 300 seconds using the free chlorine measurement reagent/total chlorine concentration] calculated by [chlorine concentration (mg/L-$Cl_2$) after 300 seconds using the DPD (Free) reagent which is free chlorine measurement reagent/total chlorine concentration (mg/L-$Cl_2$)×100(%)] in the combined-chlorine-based oxidizing agent is not particularly limited, but the preferred lower limit value thereof is preferably 1% or more, more preferably 2.5% or more, still more preferably 3% or more, even more preferably 5% or more, further more preferably 6% or more, further more preferably 7% or more, and the preferred upper limit value thereof is preferably 15% or less, more preferably 14% or less, still more preferably 13% or less, more preferably 12% or less. The preferred numerical range is still more preferably 1 to 15%, and more preferably 2.5 to 15%.

In addition, when preparing the combined-chlorine-based oxidizing agent as described above, the above indicator (preferably, Free 300-second value and/or [Free 300-second value/$Log_{10}$ (biofouling potential)]) can be used as an indicator of chemical effects to determine whether or not the combined-chlorine-based oxidizing agent can exhibit the expected chemical effects. Accordingly, it is possible to select a combined-chlorine-based oxidizing agent capable of preparing water of interest that can exhibit the desired chemical effects more satisfactorily. Then, based on the above indicator, it is also possible to provide a combined-chlorine-based chemical agent, which has passed the indicator, as a chemical agent that can exhibit the effects of the present invention.

As a result, it is possible to provide a combined-chlorine-based oxidizing agent capable of making water of interest having a Free 300-second value of a predetermined value (preferably 0.036 mg/L-$Cl_2$) or more. In addition, accordingly, it is possible to provide a combined-chlorine-based oxidizing agent that can make the water of interest having [Free 300-second value/$Log_{10}$ (biofouling potential)] of a predetermined value (preferably 0.008) or more.

By adding the combined-chlorine-based oxidizing agent or combined chlorine used in the present embodiment to the water of interest, the membrane separation method of the present embodiment can be carried out.

In addition, the present embodiment can provide a combined-chlorine-based oxidizing agent or combined chlorine, or the use thereof, which is used for exhibiting the above-described chemical effects. In addition, the combined-chlorine-based oxidizing agent or combined chlorine of the present embodiment can be used as a method capable of exhibiting the above-described chemical effects or as an active ingredient in the method.

In addition, the combined-chlorine-based oxidizing agent or combined chlorine of the present embodiment can be used for the production of preparations or various compositions that have the above-described chemical effects or have a purpose of use to exhibit the above-described chemical effects.

1-3-2. Water of Interest

The raw water (for example, water of interest) used in the present embodiment is not particularly limited, and examples thereof include industrial wastewater containing organic matter, seawater, salt water (for example, seawater or water containing salt such as brackish water), freshwater (for example, river water or lake water), industrial water, and city water.

<Biofouling Potential>

The "biofouling potential" used in the present embodiment is not particularly limited, but the preferred lower limit value thereof is preferably $1\times10^3$ cfu/mL or more, more preferably $1\times10^4$ cfu/mL or more, the preferred upper limit value thereof is preferably $1\times10^8$ cfu/mL or less, more preferably $1\times10^7$ cfu/mL or less, still more preferably $5\times10^6$ cfu/mL or less, more preferably $1\times10^6$ cfu/mL or less, more preferably $5\times10^5$ cfu/mL or less, more preferably $1\times10^5$ cfu/mL or less, and a more preferable numerical range is preferably $1\times10^3$ to $1\times10^7$ cfu/mL.

In addition, the biofouling potential can be measured by the above <Method for measuring biofouling potential (cfu/mL)>.

As a sample for measuring the biofouling potential, the water of interest at any time may be used without particular limitation, but the raw water, or the raw water or the water of interest that flows into the aqueous system or a membrane separation apparatus (preferably a reverse osmosis membrane apparatus) can be used as appropriate. The sample for measuring the biofouling potential is preferably water of interest before containing the combined-chlorine-based oxidizing agent, and more preferably raw water.

The timing for measuring the biofouling potential is not particularly limited, and examples thereof include predetermined operation intervals (for example, about 0.5 to 6 months), the operation restart time of the aqueous system, and the like. For example, raw water when entering the aqueous system may be sampled at intervals of 0.5 to 2 months, and the biofouling potential of this sampled raw water may be measured. In addition, the sampling may be performed approximately 1, 2, 3, or 4 times in a year. The latest biofouling potential is preferred for the biofouling potential to be used.

1-3-3. Water of Interest Containing Combined-Chlorine-Based Oxidizing Agent

The water of interest containing the combined-chlorine-based oxidizing agent used in the present embodiment is preferably prepared by containing the combined-chlorine-based oxidizing agent based on the above-mentioned indicator. Accordingly, it is more preferable to make the water of interest having a predetermined Free 300-second value and/or predetermined [Free 300-second value/$\log_{10}$ (biofouling potential)] or more. By allowing the water of interest containing the combined-chlorine-based oxidizing agent to pass through the membrane separation apparatus, the aqueous system can be operated for a longer period of time.

<Free 300-Second Value in Water of Interest Containing Combined-Chlorine-Based Oxidizing Agent>

The "Free 300-second value (mg/L-$Cl_2$)" used in the present embodiment is not particularly limited, but the preferred lower limit value thereof is preferably 0.025 mg/L-$Cl_2$ or more, more preferably 0.03 mg/L-$Cl_2$ or more, still more preferably 0.035 mg/L-$Cl_2$ or more, more preferably 0.036 mg/L-$Cl_2$ or more, more preferably 0.04 mg/L-$Cl_2$ or more, more preferably 0.045 mg/L-$Cl_2$ or more, more preferably 0.05 mg/L-$Cl_2$ or more, more preferably mg/L-$Cl_2$ or more, more preferably 0.07 mg/L-$Cl_2$ or more, more preferably 0.08 mg/L-$Cl_2$ or more. In addition, the preferred upper limit value of the Free 300-second value (mg/L-$Cl_2$) of the water of interest containing the combined-chlorine-based oxidizing agent is preferably 0.2 mg/L-$Cl_2$ or less, more preferably 0.15 mg/L-$Cl_2$ or less, more preferably 0.14 mg/L-$Cl_2$ or less, and a more preferable numerical range is preferably 0.036 to 0.15 mg/L-$Cl_2$.

The Free 300-second value (mg/L-$Cl_2$) can be measured according to the above <Method for measuring Free 300-second value (mg/L-$Cl_2$)>.

<[Free 300-Second Value/$\log_{10}$ (Biofouling Potential)] in Water of Interest Containing Combined-Chlorine-Based Oxidizing Agent>

[Free 300-second value/$\log_{10}$ (biofouling potential)] used in the present embodiment is not particularly limited, but the preferred lower limit value thereof is preferably 0.005 or more, more preferably 0.006 or more, further more preferably 0.007 or more, more preferably 0.008 or more, more preferably 0.009 or more, the preferable upper limit value thereof is preferably 0.5 or less, more preferably 0.1 or less, and the preferred numerical range is preferably 0.006 to 0.1.

In addition, the "Free 300-second value" of [Free 300-second value/biofouling potential] is the Free 300-second value in the water of interest containing the combined-chlorine-based oxidizing agent, and <Free 300-second value in water of interest containing combined-chlorine-based oxidizing agent> can be adopted. The "biofouling potential" of [Free 300-second value/biofouling potential] is preferably the biofouling potential in the water of interest before containing the combined-chlorine-based oxidizing agent, and the above <Biofouling potential> can be adopted.

In addition, [Free 300-second value/$\log_{10}$ (biofouling potential)] can be measured by the above <Method for calculating [Free 300-second value/$\log_{10}$ (biofouling potential)]>.

<Total Chlorine Concentration in Water of Interest Containing Combined-Chlorine-Based Oxidizing Agent>

The total chlorine concentration (active chlorine) in the water of interest containing the combined-chlorine-based oxidizing agent. A combined-chlorine-based oxidizing agent may be added to 1 L of the water of interest to achieve such total chlorine concentration.

In addition, various chlorine concentrations such as the total chlorine concentration in the water of interest containing the combined-chlorine-based oxidizing agent can be measured according to the above <Method for calculating total residual chlorine concentration>

<[Free 300-Second Value/Total Chlorine Concentration (%) in Water of Interest Containing Combined-Chlorine-Based Oxidizing Agent>

The ratio (%) of [Free 300-second value/total chlorine concentration] in the water of interest containing the combined-chlorine-based oxidizing agent, which is used in the present embodiment, is not particularly limited, but the preferred lower limit value thereof is preferably 1% or more, more preferably 3% or more, still more preferably 4% or more, more preferably 5% or more, more preferably 6% or more, further more preferably 7% or more, and the preferred upper limit value thereof is preferably 20% or less, more preferably 15, 14, or 13% or less. A preferred numerical range is preferably 3 to 20%. A combined-chlorine-based oxidizing agent may be added to 1 L of the water of interest to achieve such [Free 300-second value/total chlorine concentration].

In addition, [Free 300-second value/total chlorine concentration] can be measured according to the above <Method for calculating [Free 300-second value/total chlorine concentration]>.

<Stabilized Combined Chlorine Concentration in Water of Interest Containing Combined-Chlorine-Based Oxidizing Agent>

The stabilized combined chlorine concentration in the water of interest containing the combined-chlorine-based oxidizing agent, which is used in the present embodiment, is not particularly limited, but the preferred lower limit value thereof is preferably 0.1 mg/L-$Cl_2$ or more, more preferably 0.2 mg/L-$Cl_2$ or more, still more preferably 0.25 mg/L-$Cl_2$ or more, more preferably 0.3 mg/L-$Cl_2$ or more, more preferably 0.35 mg/L-$Cl_2$ or more, more preferably 0.4 mg/L-$Cl_2$ or more, more preferably 0.5 mg/L-$Cl_2$ or more. The preferred upper limit value thereof is not particularly limited, but from the viewpoint of chemical agent cost and chemical effects, the preferred upper limit value thereof is preferably 5.0 mg/L-$Cl_2$ or less, more preferably 4.0 mg/L-$Cl_2$ or less, still more preferably 3.0 mg/L-$Cl_2$ or less, more preferably 2.5 mg/L-$Cl_2$ or less, more preferably 2.0 or 1.5 mg/L-$Cl_2$ or less. A preferred numerical range is preferably 0.1 to 5.0 mg/L-$Cl_2$, more preferably 0.3 to 2.5 mg/L-$Cl_2$. A combined-chlorine-based oxidizing agent may be added to 1 L of the water of interest to achieve such stabilized combined chlorine concentration.

In addition, various chlorine concentrations such as the total chlorine concentration in the water of interest containing the combined-chlorine-based oxidizing agent can be measured according to the above <Method for calculating total residual chlorine concentration>.

1-4. Membrane Separation Apparatus

The membrane separation apparatus used in the present embodiment is not particularly limited, and a known apparatus configured to perform membrane separation can be used. The number of apparatuses may be singular or plural, and the apparatuses may be arranged in parallel and/or in series.

The membrane separation apparatus used in the present embodiment preferably includes a membrane separation part configured to separate out suspended matter, dissolved substances, and ions in the water of interest. The membrane separation apparatus may further include a single or a plurality of chemical agent addition parts configured to add various chemical agents to the water of interest before passing through, and the chemical agent addition parts may add a chemical agent intermittently or continuously or may add various chemical agents at the same time or at different times. Furthermore, it is more preferable that the membrane separation apparatus be provided with an external or internal control part configured to control the addition amount of chemical agent, the type of chemical agent, the timing of addition, the interval of addition, and the like, and when the control part is provided externally, the control can be performed via a server, cloud, or the like.

The membrane separation apparatus configured such that membrane separation can be performed may be applied to a membrane separation process.

The permeable membrane used for membrane separation is not particularly limited, examples thereof include reverse osmosis membranes (RO membranes), nanofiltration membranes (NF membranes), ultrafiltration membranes (UF membranes), and microfiltration membranes (MF membranes), and it is preferable to use one or more selected from these. Among these permeable membranes, reverse osmosis membranes are preferred.

Examples of the water of interest containing the combined-chlorine-based oxidizing agent (hereinafter also referred to as "feedwater") passing through the membrane separation apparatus in the present embodiment include the pH of the feedwater, the amount of feedwater, the temperature of the feedwater, the water pressure of the feedwater (MPa), total organic carbon (TOC) of feedwater, and oxidation-reduction potential (ORP) of feedwater, and one or more of these conditions can be selected. The organic matter in the feedwater is set to TOC.

In addition, it is preferable that the feedwater be "water of interest containing the combined-chlorine-based oxidizing agent to be supplied to the reverse osmosis membrane apparatus", and the feedwater in this case refers to the water to be introduced to the reverse osmosis membrane apparatus and separated by the reverse osmosis membrane, and usually corresponds to the inlet water of the reverse osmosis membrane apparatus.

The pH of the feedwater is not particularly limited, but is preferably 3.0 to 9.0, more preferably 4.0 to 8.0, and still more preferably 5.0 to 7.0. The pH may be adjusted with a pH adjuster.

The water pressure of the feedwater is not particularly limited, but is preferably 4 to 8 MPa.

The temperature of the feedwater is not particularly limited, but is preferably 4 to 50° C., more preferably 10 to 40° C.

The CODcr of the feedwater is not particularly limited, but is preferably 0.1 to 30 mg/L as $O_2$, more preferably 0.5 to 20 mg/L as $O_2$, and still more preferably 1 to 10 mg/L as $O_2$.

The acid consumption (pH 4.8) (mg/L-CaCO3) of the feedwater is not particularly limited, but is preferably 1 to 100 mg/L, more preferably 5 to 50 mg/L, and still more preferably 5 to 30 mg/L. In addition, the acid consumption (pH 4.8) is also called total alkalinity (for example, JIS K 0102 15.1 titration method).

The TOC of the feedwater is not particularly limited, but is preferably 0.1 to 20 mg/L as C, more preferably 0.5 to 10 mg/L as C, and still more preferably 0.5 to 5 mg/L as C. In addition, the TOC can be measured using a commercially available TOC analyzer capable of measuring TOC of water.

Total phosphorus in the feedwater is not particularly limited, but is preferably 0.001 [mg] to 1 mg/L, more preferably 0.005 to 0.5 mg/L. In addition, total phosphorus can be measured according to JIS K 0102 46 3.3.

Total nitrogen in the feedwater is not particularly limited, but is preferably 0.02 to 10 mg/L, more preferably 0.1 to 5 mg/L. In addition, total nitrogen can be measured according to JIS K 0102 45.4.

The conductivity of the feedwater is preferably 1 to 100 mS/m, more preferably 5 to 50 mS/m. In addition, the conductivity can be measured using a commercially available conductivity measurement apparatus capable of measuring the conductivity of water (JIS K 0102 13).

Further, the total hardness of the feedwater is not particularly limited, but is preferably 1 to 100 mg/L-CaCO3, more preferably 1 to 80 mg/L-CaCO3, and still more preferably 5 to 50 mg/L-CaCO3. In addition, the total hardness can be measured using a commercially available total hardness tester capable of measuring the total hardness (CaCO3) of water (for example, JIS K 0101 15.1).

In the aqueous system of the present embodiment, as a preferred aspect of the membrane separation apparatus, it is preferable to include a safety filter apparatus and/or a reverse osmosis membrane apparatus, and more preferably to include at least a reverse osmosis membrane apparatus.

1-4-1. Reverse Osmosis Membrane Apparatus

The reverse osmosis membrane apparatus used in the present embodiment is not particularly limited, and is preferably configured to be able to remove ions, organic matter, and the like in raw water using a reverse osmosis membrane. It is preferable that the reverse osmosis membrane apparatus be configured to be capable of desalinating seawater, producing ultrapure water, industrial water treatment, sewage treatment, wastewater recovery treatment, and reuse of wastewater. Moreover, the reverse osmosis membrane apparatus may include a single unit or a plurality of units having reverse osmosis membranes. In addition, the aqueous system may also have a single or a plurality of reverse osmosis membrane apparatuses.

<Reverse Osmosis Membrane>

The reverse osmosis membrane (hereinafter also referred to as "RO membrane") used in the present embodiment is not particularly limited, and examples thereof include polyamide-based, polyethersulfone-based, polysulfone-based, polyimide-based, polyethyleneimine-based, polyethylene oxide-based, and cellulose acetate-based membranes. Among these membranes, the polyamide-based RO membrane has the advantage that it can be preferably used because the rejection rate of ionic substances is high and the flux is high.

The combined-chlorine-based oxidizing agent used in the present embodiment can suppress deterioration even when a polyamide-based polymer membrane that has no chlorine resistance and is easily oxidized and deteriorated by free chlorine is used as a reverse osmosis membrane, and can be operated for a long period of time.

In the present embodiment, as a more preferred aspect, a pretreatment process may be included in which organic substances, suspended matter, and the like are removed from the water of interest in the pretreatment part at a stage previous to the water of interest is supplied to the reverse osmosis membrane apparatus. For example, examples of the pretreatment process include a filtration process and a safety filter treatment process, and more specific examples thereof include a process of filtering raw water (water of interest) with a filtration apparatus and a process of treating the filtered water with a safety filter. Accordingly, it is possible to obtain the pretreated water of interest to be supplied to the reverse osmosis membrane apparatus or the reverse osmosis membrane process.

In the present embodiment, as a more preferred aspect, it is preferable that the water of interest to be supplied to the reverse osmosis membrane apparatus be pretreated with a safety filter apparatus. The safety filter apparatus is preferably configured to perform a pretreatment process of the reverse osmosis membrane separation process, and more preferably provided as a preceding apparatuses before the reverse osmosis membrane apparatus.

The permeable membrane used in the filtration apparatus is not particularly limited, but one or more selected from a nanofiltration membrane (NF membranes), an ultrafiltration membrane (UF membranes), and a microfiltration membrane (MF membranes) can be used. As a result, impurities such as suspended matter in the water of interest supplied to the reverse osmosis membrane apparatus can be reduced.

In the present embodiment, the water of interest that is supplied to the reverse osmosis membrane apparatus contains a combined-chlorine-based oxidizing agent such that the chemical effects can be exhibited more satisfactorily and stably. Accordingly, the biofouling that occurred in the reverse osmosis membrane apparatus can be more satisfactorily suppressed, and as appropriate, the effects (for example, antibacterial, bactericidal, algicidal, microbial growth inhibition, and microbial metabolism inhibition effects) that can be exhibited by the combined-chlorine-based oxidizing agent can be exhibited more satisfactorily and more efficiently. As a result, the effect of suppressing biofouling that occurs in the reverse osmosis membrane apparatus and the chemical effects of the chemical agent to be used can be expected.

Moreover, by using the present embodiment, it is possible to suppress an increase in differential pressure increase rate and an increase in differential pressure change rate, and the operation for a longer period of time is possible.

Further, according to the present embodiment, the aqueous system provided with the membrane separation apparatus can be operated for a longer period of time.

The membrane separation method according to the present embodiment may be a treatment method for a reverse osmosis membrane. Moreover, the membrane separation method according to the present embodiment can be applied to an apparatus or system.

In addition, regarding the membrane separation method according to the present invention, the descriptions about each configuration such as the combined-chlorine-based oxidizing agent, the indicator, the water of interest, and the membrane separation, which overlaps with the above-described configurations and the configurations of "2." to "4." below will be appropriately omitted. However, the descriptions such as "1. Membrane separation method according to present embodiment" to "4. Water treatment apparatus according to present embodiment" also apply to the present embodiment, and the descriptions can be adopted as appropriate.

2. Application Example of Membrane Separation Method in Present Embodiment

The membrane separation method in the present embodiment can also be applied to the membrane separation apparatus. The membrane separation method of the present embodiment can be applied to slime suppression methods, biofouling suppression methods, aqueous systems, apparatuses, or systems.

The membrane separation process performed according to the membrane separation method according to the present embodiment can be applied to apparatuses or systems. For example, the membrane separation process may be applied to a membrane separation method, a membrane separation apparatus, and a membrane separation system, respectively.

The membrane separation method in the present embodiment is preferably applied to an aqueous system equipped with at least a membrane separation apparatus (preferably a reverse osmosis membrane apparatus).

Aqueous systems equipped with a membrane separation apparatus (preferably a reverse osmosis membrane apparatus) are not particularly limited, but examples thereof include water treatment aqueous systems; circulating aqueous systems such as cooling towers; process aqueous systems such as paper pulp production; and aqueous systems for seawater desalination, ultrapure water production, industrial water treatment, sewage treatment, wastewater recovery treatment, and wastewater reuse.

As an example of an aqueous system equipped with a membrane separation apparatus (preferably a reverse osmosis membrane apparatus), it is preferable to include a membrane separation apparatus configured to allow raw water to flow therein as the water of interest and separate out suspended matter, soluble substances, and ions in the water of interest, and a chemical agent addition apparatus for adding chemical agents. A measurement apparatus for measuring the Free 300-second value and a measurement apparatus for measuring the biofouling potential may further be provided. It is preferable to further include a control apparatus for carrying out the method of the present embodiment, and the control apparatus may automatically or manually acquire the data of the Free 300-second value and the biofouling potential. In addition, the raw water may be diluted or concentrated when flowing into the aqueous system.

It is preferable that the membrane separation apparatus is configured such that the desired permeation water can be obtained from the water of interest. As the chemical agent, it is preferable to use a combined-chlorine-based oxidizing agent. The chemical agent addition apparatus is preferably configured such that the chemical agent can be added to the water of interest before the water of interest is allowed to pass through the membrane separation apparatus (preferably a reverse osmosis membrane apparatus).

As an example of an aqueous system equipped with a membrane separation apparatus (preferably a reverse osmosis membrane apparatus), a coagulation treatment process in which raw water flows in as the water of interest, and a coagulant is injected into the water of interest to coagulate or flocculate suspended matter or the like; a solid-liquid separation process of separating the water of interest containing aggregates into precipitates and supernatant; and a safety filter treatment process of removing suspended matter or the like from the supernatant that has flowed in may be included sequentially or in random order. Further, these treatment processes may be performed using a treatment apparatus or a treatment part configured to perform each treatment process. Furthermore, it is more preferable to provide a reverse osmosis membrane separation process after the safety filter treatment process.

As an example of an aqueous system equipped with a reverse osmosis membrane apparatus, for example, an aqueous system 1 shown in FIG. 1 will be described, but the aqueous system according to the present embodiment is not limited to this. The aqueous system 1 equipped with a reverse osmosis membrane apparatus 2 includes a coagulation process performed by a coagulation treatment apparatus 5 configured to allow raw water to flow in as water of interest and to inject a coagulant into the water of interest to coagulate or flocculate suspended matter and the like; a solid-liquid separation process performed by a solid-liquid separation apparatus 4 configured to separate the water of interest containing aggregates into precipitates and supernatant; a pretreatment process performed by a safety filter 3 configured to perform suspended matter removal membrane separation for further removing the suspended matter and the like from the supernatant that has flowed in before the reverse osmosis membrane separation; and a reverse osmosis membrane separation process performed by the reverse osmosis membrane apparatus 2 through which the pretreated water of interest containing the combined-chlorine-based oxidizing agent passes. The reverse osmosis membrane separation process can be separated into concentrated water and desired permeation water.

Further, examples of an aqueous system equipped with a reverse osmosis membrane apparatus include a water treatment apparatus (preferably an ultrapure water apparatus) including a raw water supply channel configured to supply raw water as water of interest, and a reverse osmosis membrane apparatus configured to separate water of interest supplied from the raw water supply channel to the permeation water and the concentrated water can be performed.

Further, examples of an aqueous system equipped with a reverse osmosis membrane apparatus include a water treatment apparatus including a raw water supply channel configured to supply raw water as water of interest; a filtration apparatus and a filtration treatment water tank configured to filter the water of interest supplied from the raw water supply channel and to filter aggregates and the like; a safety filter apparatus configured as a pretreatment for reverse osmosis membrane separation by further removing insoluble substances from the filtered water of interest; and reverse osmosis membrane apparatus. The above-described suspended matter removal membrane separation may be performed by a safety filter apparatus.

In addition, the aqueous system of the present embodiment may combine each apparatus and each process described in the example of the aqueous system provided with these reverse osmosis membrane apparatuses as necessary.

In addition, the method of the present embodiment can be realized by an apparatus for implementing or managing a method such as a membrane separation method for allowing the water to pass through a membrane apparatus, a biofouling control method, a membrane separation method, and a method for operating an aqueous system equipped with a membrane separation apparatus, which are described in "1. Membrane separation method according to present embodiment" to "4. Water treatment apparatus according to present embodiment", and the control part (the control part includes a CPU or the like) provided in the apparatus, and these apparatuses or control parts can be provided. Examples of apparatuses for implementing or managing include computers, laptop computers, desktop computers, tablet PCs, PLCs, servers, and cloud services. Furthermore, the apparatus for implementing or managing the above may appropriately include an input part such as a touch panel and a keyboard, a communication part such as a transmission/reception part between each part, a network, a network access part, and a display part such as a touch panel and a display. Thereby, the method of the present embodiment can be implemented.

An apparatus or system for implementing or managing by the method of the present embodiment preferably includes an input part, an output part, a storage part, and preferably further includes a communication part and/or a measurement part.

The input part can receive a user operation by an operator who performs the method of the present embodiment. The input part can include, for example, a mouse and/or keyboard. In addition, the display surface of the display apparatus may be configured as an input part that receives a touch operation.

The output part can output the implementation or management status of the method of the present embodiment and information related thereto (for example, tables, diagrams, and descriptions). Examples of the output part include, but are not limited to, a display apparatus that displays an image, a speaker that outputs sound, and a printing apparatus that performs printing on a print medium such as paper.

The storage part can store data input by the operator and data set for checking the implementation or management status of the method of the present embodiment. The storage part may include, for example, a recording medium.

Further, the system according to the present embodiment can be executed by using a program and hardware. One embodiment (not shown) of a computer 1 according to the embodiment of the present invention is not limited to and includes at least a CPU as a component of the computer 1, and may further include one or more selected from a RAM, a storage part, an output part, an input part, a communication part, a ROM, a measurement part, and the like. Among these, it is preferable to include a RAM, a storage part, an output part, and an input part, and further, it is preferable to include at least one of the communication part, the measurement part, the ROM, and the like. It is preferable that each component is connected by, for example, a bus as a data transmission path.

Further, the method of the present embodiment can be stored as a program in hardware resources including storage media (nonvolatile memory (USB memory and the like), solid state drive (SSD), hard disk drive (HDD), CD, DVD, Blu-ray Disc, and the like), and implemented by the control part. The method of the present embodiment can be provided as a program. A storage medium storing the method of the present embodiment can be provided. Thereby, the method of the present embodiment can be implemented.

In addition, it is possible to provide an apparatus, a water treatment apparatus, a system, an aqueous system or the like for operating a membrane separation apparatus or a reverse osmosis membrane separation apparatus or for controlling biofouling, which is configured to include the control part, the storage medium or the program or the like, and perform a membrane separation treatment process or a membrane separation method including the same, or control biofouling. Thereby, the method of the present embodiment can be implemented. These apparatuses, water treatment apparatuses, systems, aqueous systems, and the like may be configured to be able to respond appropriately according to the purpose.

Further, as an example of the first embodiment, it is possible to provide a program that causes a computer to realize a membrane separation method in which the combined-chlorine-based oxidizing agent is contained to the water of interest and the water of interest containing the combined-chlorine-based oxidizing agent is allowed to pass through the membrane separation apparatus, in which the program has a first function configured to use, as an indicator, the Free 300-second value, which is the chlorine concentration measurement result after 300 seconds using the free chlorine measurement reagent in the water of interest containing the combined-chlorine-based oxidizing agent, and realizes membrane separation treatment, biofouling control or the like.

Further, as an example of the second embodiment, it is possible to provide a program that causes a computer to realize a membrane separation method in which the combined-chlorine-based oxidizing agent is contained to the water of interest and the water of interest containing the combined-chlorine-based oxidizing agent is allowed to pass through the membrane separation apparatus, in which membrane separation treatment, biofouling control or the like is realized including a first function configured to use, as an indicator, the [Free 300-second value/$\log_{10}$ (biofouling potential)] in the water of interest containing the combined-chlorine-based oxidizing agent.

Further, the program of the present embodiment can be appropriately combined with the program of the first embodiment and/or the program of the second embodiment, and can be realized by combining these in parallel or in series.

In addition, regarding the program according to the present invention, the descriptions about each configuration such as the indicator, the combined-chlorine-based oxidizing agent, the water of interest, and the membrane separation, which overlaps with the configurations of "1." above and "3." and "4." below will be appropriately omitted. However, the descriptions such as "1. Membrane separation method according to present embodiment" to "4. Water treatment apparatus according to present embodiment" also apply to the present embodiment, and the descriptions can be adopted as appropriate.

3. Water Treatment Method According to Present Embodiment

Regarding the water treatment method according to the present invention, the descriptions about each configuration such as the combined-chlorine-based oxidizing agent, the indicator, the water of interest, and the membrane separation, which overlaps with the configurations of "1." and "2." above, and "4." below will be appropriately omitted. However, the descriptions such as "1. Membrane separation method according to present embodiment" to "4. Water treatment apparatus according to present embodiment" also apply to the present embodiment, and the descriptions can be adopted as appropriate.

The present embodiment can provide a method for preparing the water of interest containing the combined-chlorine-based oxidizing agent based on the above indicator, and can further provide a membrane separation method or a water treatment method including the preparation process. As a result, it is possible to obtain the water of interest having excellent chemical effects, and by using the prepared water of interest, as described above, it is possible to operate the aqueous system equipped with the membrane separation apparatus for a longer period of time, and to suppress biofouling.

Furthermore, the present embodiment can provide a membrane separation method or a water treatment method including adjusting the addition amount of the combined-chlorine-based oxidizing agent contained in the water of interest based on the indicator. A more preferable method is a method including a process of determining the addition amount of the combined-chlorine-based oxidizing agent based on the indicator, and a chemical agent addition process based on the determination result.

By setting a predetermined value for the indicator, it is possible to determine whether the addition amount of the combined-chlorine-based oxidizing agent contained in the water of interest is increased or decreased (process of determining the addition amount increase or decrease). When the addition amount is equal to or greater than the predetermined value, it is possible to determine that the addition amount should be maintained or decreased, and when the addition amount is less than the predetermined value, it is possible to determine that the addition amount should be increased. Furthermore, the predetermined value may be in a wide numerical range, and when the addition amount is within the range of numerical values, it may be determined to maintain the addition amount of the combined-chlorine-based chemical agent.

Based on the determination result, an instruction can be given to adjust the addition amount of the combined-chlorine-based oxidizing agent, and the agent can be added such that the water of interest contains the combined-chlorine-based oxidizing agent (addition process). In addition, when the combined-chlorine-based oxidizing agent is contained to the water of interest, the combined-chlorine-based oxidizing agent may be added to the water of interest, or various chemical agents (alkali, chlorine-based oxidizing agents, chlorine stabilizers, and the like) may be added to the water of interest at the same time or at different times and mixed in the water of interest such that the combined-chlorine-based oxidizing agent is formed in the water of interest.

As a result, the addition amount of the combined-chlorine-based oxidizing agent can be made more appropriate, and the chemical agent cost can be reduced.

As the indicator used in the present embodiment, it is more preferable to set the indicator related to the Free 300-second value as the first indicator. The Free 300-second value and/or [Free 300-second value/$\log_{10}$ (biofouling potential)] is more preferable, and furthermore, a combination of one or two selected from indicators such as stabilized combined chlorine concentration, 300-second value/total chlorine concentration], biofouling potential, and total chlorine concentration is more preferable.

Examples 1 to 4 of the present embodiment will be given below as examples of the present embodiment, but the present invention is not limited to these. In addition, in Examples 1 to 4 of the present embodiment, the control part instructs the chemical agent addition part to add the chemical agent, and accordingly, the chemical agent addition part can add the combined-chlorine-based oxidizing agent to the water of interest such that the aqueous system equipped with the membrane separation apparatus can be operated for a longer period of time. As a result, it is possible to add a more appropriate addition amount of the combined-chlorine-based oxidizing agent to the water of interest, without excess or deficiency, thereby reducing cost.

Example 1 of Present Embodiment

As Example 1 of the present embodiment, a case where the Free 300-second value is used as an indicator will be described.

In step 101, the control part acquires the data of the Free 300-second value in the water of interest containing the combined-chlorine-based oxidizing agent from the outside or inside, and uses the Free 300-second value as an indicator to determine the increase or decrease of the chemical agent amount based on the indicator.

In step 102, in the water of interest containing the combined-chlorine-based oxidizing agent, in the case of the water of interest having a Free 300-second value of equal to or greater than a predetermined value, the control part maintains the addition amount of the combined-chlorine-based oxidizing agent, or instructs the chemical agent addition part to decrease the addition amount to approach the predetermined value. A predetermined value at this time may be used as a threshold value, and a more preferable threshold value is a Free 300-second value of 0.036 mg/L-$Cl_2$.

In step 103, in the water of interest containing the combined-chlorine-based oxidizing agent, in the case of the water of interest having a Free 300-second value of less than a predetermined value, the control part instructs the chemical agent addition part to increase the addition amount of the combined-chlorine-based oxidizing agent to be equal to or greater than the predetermined value.

In Example 1 of the present embodiment, by performing the steps 101 to 103, it is possible to operate the system for a longer period of time, and it is possible to add a more appropriate addition amount of the combined-chlorine-based oxidizing agent without excess or deficiency, thereby reducing cost.

Example 2 of Present Embodiment

[Free 300-second value/$Log_{10}$ (biofouling potential)] will be described as Example 2 of the present embodiment.

In step 201, the control part acquires the data of the biofouling potential of the water of interest (for example, raw water) before adding the combined-chlorine-based oxidizing agent and the data of the Free 300-second value in the water of interest containing the combined-chlorine-based oxidizing agent, from outside or inside. Then, [Free 300-second value/$Log_{10}$ (biofouling potential)] is used as an indicator, and the increase or decrease in the chemical agent amount is determined based on the indicator.

In step 202, in the water of interest containing the combined-chlorine-based oxidizing agent, in a case where the [Free 300-second value/$Log_{10}$ (biofouling potential)] is equal to or greater than a predetermined value, the control part maintains the addition amount of the combined-chlorine-based oxidizing agent, or decreases the addition amount to approach the predetermined value. A predetermined value at this time may be used as a threshold value, and as a more preferable threshold value, the [Free 300-second value/$Log_{10}$ (biofouling potential)] is 0.008.

In step 203, in the water of interest containing the combined-chlorine-based oxidizing agent, in a case of the water of interest having the [Free 300-second value/$Log_{10}$ (biofouling potential)] of less than the predetermined value, the control part increases the addition amount of the combined-chlorine-based oxidizing agent to be equal to or greater than the predetermined value.

In Example 2 of the present embodiment, by performing the steps 201 to 203, it is possible to operate the system for a longer period of time, and it is possible to add a more appropriate addition amount of the combined-chlorine-based oxidizing agent without excess or deficiency, thereby reducing cost.

Example 3 of Present Embodiment

As Example 3 of the present embodiment, Example 1 and Example 2 of the present embodiment may be combined, and these steps 101 to 103 and steps 201 to 203 can be performed in parallel or in series such that the addition amount of the combined-chlorine-based oxidizing agent becomes an appropriate addition amount.

Example 4 of Present Embodiment

As Example 4 of the present embodiment, in addition to the indicators of Examples 1 to 3 of the present embodiment, other indicators may be combined. These can be performed in parallel or in series, and can be performed such that the addition amount of the combined-chlorine-based oxidizing agent becomes an appropriate addition amount.

For example, before performing any of Examples 1 to 3 of the present embodiment, the total chlorine concentration in the water of interest containing the combined-chlorine-based oxidizing agent can be measured, and when the total chlorine concentration is less than a predetermined value, it is possible to change the added combined-chlorine-based oxidizing agent to another lot of the combined-chlorine-based oxidizing agent. By changing the combined-chlorine-based oxidizing agent to be equal to or greater than the predetermined value, any one of Examples 1 to 3 of the present embodiment can be performed by the combined-chlorine-based oxidizing agent that is equal to or greater than the predetermined value. Further, even when any one of Examples 1 to 3 of the present embodiment is performed, similarly, it is possible to determine whether or not the combined-chlorine-based oxidizing agent exhibits better chemical effects based on the total chlorine concentration in the water of interest containing the combined-chlorine-based oxidizing agent.

4. Water Treatment Apparatus According to Present Embodiment

Regarding the water treatment apparatus according to the present invention, the descriptions about each configuration such as the combined-chlorine-based oxidizing agent, the indicator, the water of interest, and the membrane separation, which overlaps with the configurations of above "1.", "2.", and "3." will be appropriately omitted. However, the descriptions such as "1. Membrane separation method according to present embodiment" to "4. Water treatment apparatus according to present embodiment" also apply to the present embodiment, and the descriptions can be adopted as appropriate.

Moreover, the water treatment apparatus according to the present embodiment may be a water treatment apparatus or aqueous system having at least a membrane separation apparatus (preferably a reverse osmosis membrane apparatus). The water treatment apparatus may be a water treatment aqueous system or a water treatment system.

The water treatment apparatus according to the present embodiment is preferably a water treatment apparatus that implements the method of the present embodiment, which includes a membrane separation apparatus (preferably a reverse osmosis membrane apparatus).

It is preferable that the water treatment apparatus according to the present embodiment implements the membrane separation method, the biofouling suppression method, the operation method of an aqueous system including the membrane separation apparatus, and the like of the present embodiment.

The water treatment apparatus according to the present embodiment preferably includes at least a chemical agent addition part and a membrane separation part (preferably, a reverse osmosis membrane part), further preferably includes a control part that controls these parts, and preferably further includes a safety filter part as a pretreatment part before the reverse osmosis membrane part. The chemical agent addition part is preferably connected to a flow path upstream or downstream of the safety filter part and/or to a flow path upstream of the reverse osmosis membrane part, and examples of the connected part include a flow path between the safety filter part and the part therebefore, and a flow path between the safety filter part and the reverse osmosis membrane part. Thereby, each chemical agent can be contained in the water of interest, and the water of interest containing each chemical agent can be supplied to the reverse osmosis membrane apparatus. In addition, each of these parts may be singular or plural, and these units may be apparatuses. In addition, the present embodiment may be implemented by the control part, or may be implemented by an apparatus such as a control apparatus for water treatment, a water treatment apparatus, a water treatment system, or an aqueous system.

The present embodiment can employ the following configuration.

[1] A membrane separation method in which a combined-chlorine-based oxidizing agent is contained to water of interest, and the water of interest containing the combined-chlorine-based oxidizing agent after addition is allowed to pass through a membrane separation apparatus, in which the water of interest containing the combined-chlorine-based oxidizing agent after addition is the water of interest having a Free 300-second value of 0.036 mg/L-$Cl_2$ or more, while the Free 300-second value is a measurement result of a chlorine concentration after 300 seconds using a free chlorine measurement reagent.

When the combined-chlorine-based oxidizing agent is contained to the water of interest, it is preferable to add the combined-chlorine-based oxidizing agent to the water of interest, or to add various chemical agents (alkali, chlorine-based oxidizing agents, chlorine stabilizers, and the like) to the water of interest at the same time or at different times and perform mixing in the water of interest such that the combined-chlorine-based oxidizing agent is formed in the water of interest. It is more preferable to add the combined-chlorine-based oxidizing agent to the water of interest.

[2] A membrane separation method in which a combined-chlorine-based oxidizing agent is contained to water of interest, and the water of interest containing the combined-chlorine-based oxidizing agent after addition is allowed to pass through a membrane separation apparatus, in which the water of interest containing the combined-chlorine-based oxidizing agent after addition is the water of interest having [Free 300-second value/$Log_{10}$ (biofouling potential)] of 0.008 or more, the Free 300-second value is a chlorine concentration (mg/L-$Cl_2$) obtained by containing a combined chlorine-based oxidizing agent to the water of interest and performing measurement after 300 seconds using a free chlorine measurement reagent in the water of interest containing the combined chlorine-based oxidizing agent after addition, and the biofouling potential is the number of bacteria (cfu/mL) in a sample when stored for 7 days when the water of interest before adding a combined-chlorine-based oxidizing agent is stored under dark conditions at 30° C. for 7 days. When the combined-chlorine-based oxidizing agent is contained to the water of interest, it is preferable to add the combined-chlorine-based oxidizing agent to the water of interest, or to add various chemical agents (alkali, chlorine-based oxidizing agents, chlorine stabilizers, and the like) to the water of interest at the same time or at different times and perform mixing in the water of interest such that the combined-chlorine-based oxidizing agent is formed in the water of interest. It is more preferable to add the combined-chlorine-based oxidizing agent to the water of interest.

[3] The membrane separation method according to [1] or [2] above, in which a biofouling potential is $1\times10^3$ to $1\times10^7$ cfu/mL in the membrane separation method.

[4] The membrane separation method according to [1] above, in which the water of interest containing the combined-chlorine-based oxidizing agent after addition is the water of interest having [Free 300-second value/$Log_{10}$ (biofouling potential)] of 0.008 or more, or the membrane separation method according to [2] above, in which the water of interest containing the combined-chlorine-based oxidizing agent after the addition has a Free 300-second value of 0.036 mg/L-$Cl_2$ or more.

[5] The membrane separation method according to any one of [1] to [4] above, in which the combined-chlorine-based oxidizing agent is added before the water is allowed to pass through a reverse osmosis membrane apparatus, and more preferably between the safety filter apparatus and the reverse osmosis membrane apparatus.

[6] The membrane separation method according to any one of [1] to [5] above, in which (a) Free 300-second value and/or (b) biofouling potential are used as indicators, and based on the indicators, an addition amount of the combined-chlorine-based oxidizing agent to be added to the water of interest is controlled. Preferably, when the indicator is equal to or greater than the threshold value, the addition amount of the combined-chlorine-based oxidizing agent is maintained or reduced, or when the indicator is less than the threshold value, the addition amount of the combined-chlorine-based oxidizing agent is increased.

[7] The membrane separation method according to any one of [1] to [6], in which the membrane separation method is a method for suppressing biofouling or a method for operating an aqueous system equipped with a membrane separation apparatus.

[8] The membrane separation method according to any one of [1] to [7] above, in which a total chlorine concentration of the water of interest containing the combined-chlorine-based oxidizing agent is 0.1 mg/L-$Cl_2$ or more, and/or a stabilized combined chlorine concentration is 0.1 mg/L-$Cl_2$ or more.

[9] The membrane separation method according to any one of [1] to [8] above, in which the membrane separation method is one or two membrane separation methods selected from reverse osmosis membranes (RO membranes), nanofiltration membranes (NF membranes), ultrafiltration membranes (UF membranes), and microfiltration membranes (MF membranes), and the RO membrane separation method is preferable.

[10] A water treatment aqueous system or a water treatment apparatus for carrying out the membrane separation method according to any one of [1] to [8] above.

[11] A water treatment aqueous system or a water treatment apparatus including at least a membrane separation apparatus further including a control part configured to perform the membrane separation method according to any one of [1] to [8] above.

[12] A method for preparing the combined-chlorine-based oxidizing agent based on indicators while using (a) Free 300-second value and/or (b) biofouling potential as the indicators. The preparation method is a method for preparing a combined-chlorine-based oxidizing agent to be contained to the water of interest, and it is preferable to prepare a combined-chlorine-based oxidizing agent that can produce the desired chemical effects in the water of interest.

EXAMPLES

Embodiments of the present invention will be described with reference to the following test examples, examples, and comparative examples. In addition, the scope of the present invention is not limited to test examples, examples, and the like.

In addition, in the present [Example], according to the above <Method for measuring Free 300-second value (mg/L-Cl$_2$)>, <Method for calculating total chlorine concentration (total residual chlorine concentration)>, and <Method for measuring biofouling potential (cfu/mL)>, and the like, various measurement values such as chlorine concentration and biofouling potential were obtained.

<Chemical Preparation>

Each sample (Chemicals 1 to 3) was prepared with the formulation shown in Table 1 below. Table 1 shows the ratio of the Free 300-second value to the total chlorine concentration. The ratio (%) of the Free 300-second value to the total chlorine concentration was calculated by [Free 300-second value (mg/L-Cl$_2$)/total chlorine concentration (mg/L-Cl$_2$)]×100(%). The total chlorine concentration and the Free 300-second value were calculated by the above <Method for measuring Free 300-second value (mg/L-Cl$_2$)> and <Method for calculating total chlorine concentration (total residual chlorine concentration)>. 12% of 12% sodium hypochlorite is the total chlorine concentration (Cl$_2$), and the sulfamic acid compound with respect to the total chlorine concentration (Cl$_2$) 1 mol was within the range of 1.0 to 1.5 mol.

Chemicals 1 to 3 are combined-chlorine-based oxidizing agents prepared by mixing together aqueous solutions of alkalis, oxidizing agents, and chlorine stabilizers shown in Table 1, and all of these chemicals have a pH of 13 or higher.

TABLE 1

| (Parts by mass) | Chemical 1 | Chemical 2 | Chemical 3 |
|---|---|---|---|
| Water | Residue | Residue | Residue |
| 48% sodium hydroxide | 12~24 | 12~24 | 12~24 |
| Sulfamic acid | 10.0 | 12 | 18.0 |
| 12% sodium hypochlorite | 60.0 | 60 | 50.0 |
| Total amount (100% by mass) | 100 | 100 | 100 |
| Ratio of Free 300-second value to total chlorine concentration (%) | 11.6% | 7.03% | 2.7% |

<Measurement of Biofouling Potential>

The raw water, which is the water of interest, was sampled in a 200 mL sterilized bottle, and the viable count (cfu/mL) in the sample water after storage for 7 days under dark conditions at 30° C. was used as an indicator of the likelihood of biofouling. A commercially available disposable plastic container sterilized with gamma rays was used as the sterilized bottle. The viable count (cfu/mL) in this sample water was measured according to a general bacteria test method in service water and wastewater according to MS K 0350-10-10. More specifically, the viable count (cfu/mL) was measured using a commercially available trypticase soy agar medium (TSA) for measuring microorganisms, with a smear amount of 100 μL on the medium, and culture conditions of 30° C. for approximately 7 days.

The properties of the raw water used in Test Examples 1 and 2 are as follows, and dechlorinated tap water from Nogi Town was used as the raw water. The raw water (water of interest) used in Test Examples 1 and 2 was obtained by changing only the concentration of TOC and P in this raw water by adjusting the nutrient source.

<Raw Water>

Conductivity: 24 mS/m, total hardness: 32 mg/L-CaCO3, calcium hardness: 26 mg/L-CaCO3, magnesium hardness: 6 mg/L-CaCO3, chloride ion: 65 mg/L, sulfate ion: 11 mg/L, silica: 6 mg/L, CODcr: 7 mg/L, sodium ions: 30 mg/L, potassium: 1.73 mg/L, acid consumption (4.8): 15 mg/L-CaCO3.

(1) Properties of raw water (water of interest) when water passes (is supplied) through the RO membrane separation apparatus used in Test Example 1:
TOC: 0.6 mg/L as C, N: 1.6 mg/L as N, P: 0.02 mg/L as P, pH: 6.8 to 7

(2) Properties of raw water (water of interest) when water passes (is supplied) through the RO membrane separation apparatus used in Test Example 2:
TOC: 1.2 mg/L as C, N: 1.6 mg/L as N, P: 0.04 mg/L as P, and pH: 6.8 to 7, and raw water conditions were set such that C was rate-limiting for microbial growth.

[Test Example 1] Data of Present Embodiment "Differential Pressure Increase Suppression Test to Minimum Addition Amount"

Three types of combined-chlorine-based oxidizing agents with different Free 300-second values due to different formulations were added to the water of interest while changing the addition amount, and the effect of suppressing the increase in the module differential pressure of the reverse osmosis membrane was confirmed. At this time, a method for measuring and calculating the differential pressure increase rate and differential pressure change rate using a water passage apparatus that simulates an RO membrane module with reference to the membrane fouling simulator in Non-Patent Literature 1 (J. S. Vrouwenvelder et. al. *IWA Publishing* (2011)), was also performed with reference to this Non-Patent Literature 1. The reverse osmosis membrane used at this time was a polyamide-based RO membrane (manufactured by Nitto Denko Corporation).

The biofouling potential of raw water used in Test Example 1 was $1.6\times10^4$ cfu/mL.

<Procedure>

Test water having a biofouling potential of $1.6\times10^4$ cfu/mL was allowed to pass as water of interest through a water passage apparatus simulating an RO membrane module, and the progress of biofouling was observed using the differential pressure increase rate. In order to quantify the effects of chemicals, the differential pressure increase rate was adjusted for each total chlorine concentration after chemical addition. 2 kPa/d was set as the threshold value of the differential pressure increase rate, and it was determined that biofouling could not be suppressed when the differential pressure increase rate becomes equal to or greater than the threshold value.

<Results and Discussion>

Chemical 1 was added to the water of interest, water of interest No. 1 to 7 containing a combined-chlorine-based oxidizing agent were prepared, and the total chlorine concentration, free chlorine concentration, and Free 300-second value in the water of interest containing the combined-chlorine-based oxidizing agent were measured according to the above <Method for measuring Free 300-second value (mg/L-Cl₂)>, <Method for calculating total residual chlorine concentration>, and the like.

For example, in the case of Chemical 1-No. 1, the Free 300-second value was 0.139 mg/L-Cl₂ when the total chlorine concentration was 1.20 mg/L-Cl₂. In the case of Chemical 1-No. 2, the Free 300-second value was 0.122 mg/L-Cl₂ when the total chlorine concentration was 1.05 mg/L-Cl₂. In the case of Chemical 1-No. 6, the Free 300-second value was 0.052 mg/L-Cl₂ when the total chlorine concentration was 0.45 mg/L-Cl₂. In the case of Chemical 1-No. 7, the Free 300-second value was 0.035 mg/L-Cl₂ when the total chlorine concentration was 0.30 mg/L-Cl₂.

Chemical 3 was added to the water of interest, the water of interest No. 1 to 3 containing a combined-chlorine-based oxidizing agent were prepared, and the total chlorine concentration, free chlorine concentration, and Free 300-second value in the water of interest containing the combined-chlorine-based oxidizing agent were measured according to the <Method for calculating total residual chlorine concentration>. For example, in the case of Chemical 3-No. 1, the Free 300-second value was 0.036 mg/L-Cl₂ when the total chlorine concentration was 1.20 mg/L-Cl₂. In the case of Chemical 3-No. 2, the Free 300-second value was 0.032 mg/L-Cl₂ when the total chlorine concentration was 1.05 mg/L-Cl₂. In the case of Chemical 3-No. 3, the Free 300-second value was 0.027 mg/L-Cl₂ when the total chlorine concentration was 0.90 mg/L-Cl₂.

The results of Test Example 1 are shown in Table 1 below. In the addition amount of Chemical 1 to the water of interest, when the Free 300-second value was 0.035 mg/L-Cl₂ or less, a differential pressure increase exceeding 2 kPa/d was observed for the first time, and the total chlorine concentration at this time was 0.3 mg/L-Cl₂ or less.

In addition, in the addition amount of Chemical 3 was added to the water of interest, when the Free 300-second value was 0.032 mg/L-Cl₂ or less, a differential pressure increase exceeding 2 kPa/d was observed for the first time, and the total chlorine concentration at this time was 1.05 mg/L-Cl₂ or less.

From this, even when the water of interest containing Chemical 1 (chemical 1-No. 2) and the water of interest containing Chemical 3 (Chemical 3-No. 2) each had a total chlorine concentration of approximately 1 mg/L-Cl₂ in the water of interest, which is relatively high and substantially the same, biofouling occurred in the case of water of interest containing Chemical 3 (Chemical 3-No. 2), and biofouling could be suppressed in the case of water of interest containing Chemical 1 (Chemical 1-No. 2). Furthermore, in the case of the water of interest containing Chemical 1 (Chemical 1-No. 6), although the total chlorine concentration was 0.45 mg/L-Cl₂, which was less than half of the total chlorine concentration of the water of interest containing Chemical 3 (Chemical 3-No. 2), biofouling could be suppressed. The Free 300-second value for each water of interest containing these was 0.1225 mg/L-Cl₂ for the water of interest containing Chemical 1 (Chemical 1-No. 2), 0.0525 mg/L-Cl₂ for the water of interest containing Chemical 1 (Chemical 1-No. 6), and 0.032 mg/L-Cl₂ for the water of interest containing Chemical 3 (Chemical 3-No. 2), and the present inventors thought that biofouling could be more satisfactorily suppressed and the aqueous system equipped with the membrane separation apparatus could be operated for a longer period of time by managing using the Free 300-second value as an indicator of chemical effects.

In addition, in the [Free 300-second value/total chlorine concentration] in the water of interest containing Chemicals 1-Nos. 1 to 7, the lower limit value was 0.116 and the upper limit value was 0.117, and the average value was 0.116. In the [Free 300-second value/total chlorine concentration] in the water of interest containing Chemicals 3-Nos. 1 to 3, the lower limit value was 0.030 and the upper limit value was 0.030, and the average value was 0.030.

From this (refer to Tables 2 and 3), when the biofouling potential was 105 cfu/mL or less (preferably $1.6 \times 10^4$ cfu/mL), it can be said that biofouling could be suppressed by adding chemicals such that the water of interest has a Free 300-second value of 0.036 mg/L-Cl₂ or more regardless of the total chlorine concentration.

TABLE 2

| Chemical 1 | | | |
|---|---|---|---|
| Chemical 1-No. | Free 300-second value | Stabilized combined chlorine concentration | Differential pressure increase rate |
| 1-1 | 0.139 mg/L-Cl₂ | 1.061 mg/L-Cl₂ | <2 kPa/d |
| 1-2 | 0.122 mg/L-Cl₂ | 0.928 mg/L-Cl₂ | <2 kPa/d |
| 1-3 | 0.104 mg/L-Cl₂ | 0.796 mg/L-Cl₂ | <2 kPa/d |
| 1-4 | 0.087 mg/L-Cl₂ | 0.663 mg/L-Cl₂ | <2 kPa/d |
| 1-5 | 0.070 mg/L-Cl₂ | 0.530 mg/L-Cl₂ | <2 kPa/d |
| 1-6 | 0.052 mg/L-Cl₂ | 0.398 mg/L-Cl₂ | <2 kPa/d |
| 1-7 | 0.035 mg/L-Cl₂ | 0.265 mg/L-Cl₂ | 2.45 kPa/d |
| Chemical 3 | | | |
| Chemical 3-No. | Free 300-second value | Stabilized combined chlorine concentration | Differential pressure increase rate |
| 3-1 | 0.036 mg/L-Cl₂ | 1.164 mg/L-Cl₂ | <2 kPa/d |
| 3-2 | 0.032 mg/L-Cl₂ | 1.018 mg/L-Cl₂ | 3.6 kPa/d |
| 3-3 | 0.027 mg/L-Cl₂ | 0.873 mg/L-Cl₂ | 4.3 kPa/d |

[Test Example 2] Data of Present Invention "Differential Pressure Increase Suppression Test (Same Addition Amount)"

The effect of suppressing the increase in the module differential pressure of the reverse osmosis membrane by three types of combined-chlorine-based oxidizing agents with different Free 300-second values (mg/L-Cl₂) of the water of interest due to differences in the formulation were confirmed. In addition, the water passage apparatus, the measurement method, and the like in [Test Example 2] were the same as those in [Test Example 1].

<Procedure>

Test water with a biofouling potential of $7.3 \times 10^4$ cfu/mL was allowed to pass through the water passage apparatus simulating the RO membrane module as the water of interest, the addition amounts of each of Chemicals 1 to 3 were adjusted to the same total chlorine concentration (1.05 mg/L-Cl₂), and the biofouling inhibitory ability was compared by the differential pressure increase rate (slope).

<Results and Discussion>

Figure 2:
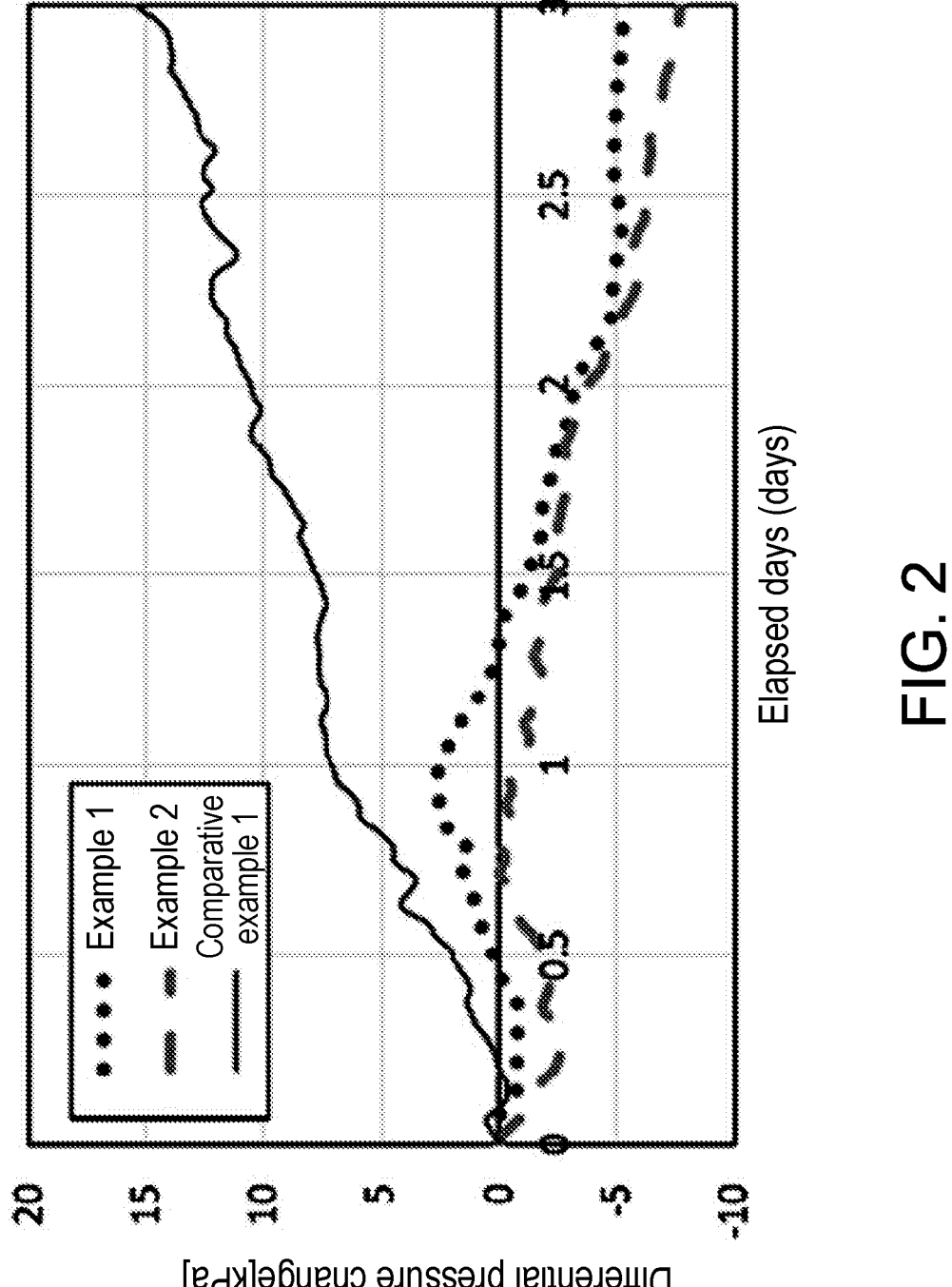
FIG. 2 shows differential pressure changes of reverse osmosis membranes over time in respective aqueous systems equipped with membrane separation apparatuses using Chemical 1, Chemical 2, and Chemical 3. The dotted line indicates Example 1, the dashed line indicates Example 2, and the solid line indicates Comparative Example 1. The vertical axis indicates the differential pressure change [kPa], and the horizontal axis indicates the elapsed days (days). As for the differential pressure change, the differential pressure change is 0 kPa on the 0th day.

The results are shown in Table 3 below and FIG. 2. In the case of each water of interest to which Chemical 1, Chemical 2, and Chemical 3 were added such that the total chlorine concentrations were the same based on the total chlorine concentration, as a result, Chemicals 1 and 2 could suppress the differential pressure increase, but Chemical 3 could not suppress the differential pressure increase. Even in this case, similar to Test Example 1 above, the Free 300-second value can be used as an indicator to more effectively determine the chemical effects. Thus, it was confirmed that, by using the Free 300-second value (mg/L-$Cl_2$) as an indicator of the chemical agent, biofouling could be suppressed and the aqueous system could be operated for a longer period of time.

Furthermore, as a result of further examination of the relationship between the Free 300-second value (mg/L-$Cl_2$) and the biofouling potential (cfu/mL), the ratio of [Free 300-second value (mg/L-$Cl_2$)/$Log_{10}$ (biofouling potential) (cfu/mL)] could be used as an indicator of chemical effects. At this time, the threshold value was considered to be 0.008 or more.

and could be used as a reference when determining water treatment conditions in the membrane separation apparatus or membrane separation process.

In addition, when monitoring the concentration at the site, the present inventors found that, by measuring the Free 300-second value (mg/L-$Cl_2$) in addition to the total chlorine concentration, and it was possible to understand that the treatment conditions were appropriate.

In addition, the present inventors found that, when using the combined-chlorine-based oxidizing agent, the difference between the Total chlorine concentration (mg/L-$Cl_2$) and the Free 300-second value (mg/L-$Cl_2$) was the stabilized combined chlorine concentration (mg/L-$Cl_2$), but this stabilized combined chlorine concentration existed to a certain extent within the range in which the combined-chlorine-based oxidizing agent was normally used. The present inventors thought that the range of the stabilized combined chlorine concentration was preferably 0.1 to mg/L-$Cl_2$, more preferably 0.3 to 2.5 mg/L-$Cl_2$.

The present inventors also examined the relationship between the biofouling potential (cfu/mL) and the Free

TABLE 3

|  | Water of interest containing Chemical 1 | Water of interest containing Chemical 2 | Water of interest containing Chemical 3 |
|---|---|---|---|
| Free 300-second value (mg/L-$Cl_2$) | 0.122 mg/L-$Cl_2$ | 0.074 mg/L-$Cl_2$ | 0.032 mg/L-$Cl_2$ |
| [Free 300-second value/total chlorine concentration] (%) | 11.6% | 7.03% | 2.7% |
| Stabilized combined chlorine concentration (mg/L-$Cl_2$) | 0.934 mg/L-$Cl_2$ | 0.976 mg/L-$Cl_2$ | 1.018 mg/L-$Cl_2$ |
| Differential pressure change rate (kPa/d) | −2.5 kPa/d | −2.4 kPa/d | +4.98 kPa/d |

Based on the above, the present inventors found that combined-chlorine-based oxidizing agents such as chlorosulfamic acid had different chemical effects such as bactericidal power depending on the grade of raw materials, formulation, storage conditions, and the like.

Furthermore, the present inventors found that the value (mg/L-$Cl_2$) after 300 seconds after adding the Free reagent to the water of interest containing the combined chlorine-based oxidizing agent by the DPD method was appropriate as an indicator for measuring the chemical effects such as the bactericidal power of the combined-chlorine-based oxidizing agent. In the normal DPD method, by using the Free reagent and reading the indicated value within 30 seconds after adding the free reagent to the water of interest containing the combined-chlorine-based oxidizing agent, free chlorine concentration (mg/L-$Cl_2$) in the water of interest containing the combined-chlorine-based oxidizing agent is measured. The present inventors found that, by extending the time to read the value (mg/L-$Cl_2$) from adding the Free reagent to the water of interest containing the combined-chlorine-based oxidizing agent to 300 seconds, it was possible to determine whether or not the combined-chlorine-based oxidizing agent or the water of interest containing the combined-chlorine-based oxidizing agent had chemical effects such as a certain degree of bactericidal power.

Then, the present inventors found that the ratio (%) of the Free 300-second value (mg/L-$Cl_2$) in the water of interest of the combined-chlorine-based oxidizing agent to the total chlorine concentration (mg/L-$Cl_2$) in the water of interest containing the combined-chlorine-based oxidizing agent was calculated, and the magnitude of the value could be used as an indicator of chemical effects such as bactericidal power 300-second value (mg/L-$Cl_2$). A simple calculation of ratios of these revealed that the change in biofouling potential values was extremely large compared to the Free 300-second value to determine a single value. Therefore, the present inventors thought that it was more appropriate to use the value of "Free 300-second value (mg/L-$Cl_2$)/$Log_{10}$ (biofouling potential (cfu/mL))". For example, in Test Example 1, "Free 300-second value (mg/L-$Cl_2$)/$Log_{10}$ (biofouling potential (cfu/mL))"="$0.036/Log_{10}$ $(1.6^4)$"=0.0086. The present inventors thought that, when this value of "Free 300-second value (mg/L-$Cl_2$)/$Log_{10}$ (biofouling potential (cfu/mL))" was a predetermined value (preferably 0.0086) or more, the differential pressure increase could be suppressed satisfactorily.

Under the conditions of Chemical 2 in Test Example 2, the value of "Free 300-second value (mg/L-$Cl_2$)/$Log_{10}$ (biofouling potential (cfu/mL))" was 0.0152, and thus the difference differential pressure increase was suppressed. Under the condition of chemical 3, this value was 0.0066, and thus a differential pressure increase occurred. Therefore, the present inventors thought that "Free 300-second value (mg/L-$Cl_2$)/$Log_{10}$ (biofouling potential (cfu/mL))" could be used as an indicator of chemical effects.

Thus, by using the new concept of the Free 300-second value (mg/L-$Cl_2$) for determining the chemical effects, in the present embodiment, it was possible to enhance the chemical effects, specifically the effect of suppressing biofouling and the like, of the combined-chlorine-based oxidizing agent or the water of interest containing the combined-chlorine-based oxidizing agent, which was used in the aqueous system equipped with the membrane separation apparatus, and the membrane separation treatment process. Accordingly, it is possible to operate the aqueous system for a longer period of time.

In addition, by using the Free 300-second value (mg/L-$Cl_2$) of the present embodiment, it is possible to more accurately understand the status of chemical effects such as the bactericidal power of chemical agents added in the aqueous system equipped with the membrane separation apparatus or in the membrane separation process. In the conventional technology in which the total chlorine concentration in the water of interest was used as an indicator of the chemical effect, biofouling occurred in some cases, and thus the biofouling was suppressed by adding an excessive amount of the chemical agents. However, by using the Free 300-second value (mg/L-$Cl_2$) of the present embodiment, it is possible to suppress the excessive addition, and to reduce the waste of chemical agents.

REFERENCE SIGNS LIST

1 Aqueous system
2 Reverse osmosis membrane apparatus
3 Safety filter
4 Solid-liquid separation apparatus
5 coagulation treatment apparatus
10 Chemical agent addition apparatus

The invention claimed is:

1. A membrane separation method in which a combined-chlorine-based oxidizing agent is contained to water of interest, and the water of interest containing the combined-chlorine-based oxidizing agent is allowed to pass through a membrane separation apparatus, wherein a ratio of [a Free 300-second value/a total chlorine concentration] in the combined-chlorine-based oxidizing agent is 5% to 15%, a molar ratio of a chlorine stabilizer to 1 mol of the total chlorine concentration in the combined-chlorine-based oxidizing agent is 1.0 to 1.5 mol, the water of interest containing the combined-chlorine-based oxidizing agent is the water of interest having the Free 300-second value of 0.036 mg/L-$Cl_2$ or more, a stabilized combined chlorine concentration in the water of interest containing the combined-chlorine-based oxidizing agent is 0.1 to 5.0 mg/L-$Cl_2$, and the Free 300-second value is a measurement result of a chlorine concentration after 300 seconds using a free chlorine measurement reagent.

2. A membrane separation method in which a combined-chlorine-based oxidizing agent is contained to water of interest, and the water of interest containing the combined-chlorine-based oxidizing agent is allowed to pass through a membrane separation apparatus, wherein a ratio of [a Free 300-second value/a total chlorine concentration] in the combined-chlorine-based oxidizing agent is 5% to 15%, a molar ratio of a chlorine stabilizer to 1 mol of the total chlorine concentration in the combined-chlorine-based oxidizing agent is 1.0 to 1.5 mol, the water of interest containing the combined-chlorine-based oxidizing agent is the water of interest having the Free 300-second value of 0.036 mg/L-$Cl_2$ or more, a stabilized combined chlorine concentration in the water of interest containing the combined-chlorine-based oxidizing agent is 0.1 to 5.0 mg/L-$Cl_2$, and the water of interest containing the combined-chlorine-based oxidizing agent is the water of interest having [Free 300-second value/$Log_{10}$ (biofouling potential)] of 0.008 or more, wherein the Free 300-second value is a chlorine concentration (mg/L-$Cl_2$) obtained by containing a combined chlorine-based oxidizing agent to the water of interest and performing measurement after 300 seconds using a free chlorine measurement reagent in the water of interest containing the combined chlorine-based oxidizing agent, and the biofouling potential is a number of bacteria (cfu/mL) in a sample when stored for 7 days when water of interest before containing a combined-chlorine-based oxidizing agent is stored under dark conditions at 30° C. for 7 days.

3. The membrane separation method according to claim 1, wherein a biofouling potential is $1 \times 10^3$ to $1 \times 10^7$ cfu/mL in the membrane separation method.

4. The membrane separation method according to claim 1, wherein the water of interest containing the combined-chlorine-based oxidizing agent is the water of interest having [Free 300-second value/$Log_{10}$ (biofouling potential)] of 0.008 or more.

5. The membrane separation method according to claim 1, wherein the combined-chlorine-based oxidizing agent is contained to the water of interest before the water is allowed to pass through a reverse osmosis membrane apparatus.

6. The membrane separation method according to claim 1, wherein (a) Free 300-second value and/or (b) biofouling potential are used as indicators, and based on the indicators, an addition amount of the combined-chlorine-based oxidizing agent to be contained to the water of interest is controlled.

7. The membrane separation method according to claim 1, wherein the membrane separation method is a method for suppressing biofouling or a method for operating an aqueous system equipped with the membrane separation apparatus.

8. The membrane separation method according to claim 2, wherein the biofouling potential is $1 \times 10^3$ to $1 \times 10^7$ cfu/mL in the membrane separation method.

9. The membrane separation method according to claim 2, wherein the combined-chlorine-based oxidizing agent is contained to the water of interest before the water is allowed to pass through a reverse osmosis membrane apparatus.

10. The membrane separation method according to claim 2, wherein (a) Free 300-second value and/or (b) biofouling potential are used as indicators, and based on the indicators, an addition amount of the combined-chlorine-based oxidizing agent to be contained to the water of interest is controlled.

11. The membrane separation method according to claim 2, wherein the membrane separation method is a method for suppressing biofouling or a method for operating an aqueous system equipped with the membrane separation apparatus.

\* \* \* \* \*